United States Patent
Teramoto et al.

(10) Patent No.: US 9,866,806 B2
(45) Date of Patent: Jan. 9, 2018

(54) PRISM UNIT AND PROJECTOR

(71) Applicant: Konica Minolta Inc., Tokyo (JP)

(72) Inventors: Miyuki Teramoto, Osaka (JP); Yasumasa Sawai, Nara (JP); Koji Takahara, Osaka (JP); Masahiro Terada, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 312 days.

(21) Appl. No.: 14/859,883

(22) Filed: Sep. 21, 2015

(65) Prior Publication Data
US 2016/0085081 A1 Mar. 24, 2016

(30) Foreign Application Priority Data

Sep. 19, 2014 (JP) .................. 2014-191149

(51) Int. Cl.
| | |
|---|---|
| G02B 27/10 | (2006.01) |
| G02B 27/14 | (2006.01) |
| H04N 9/31 | (2006.01) |
| G02B 27/12 | (2006.01) |
| G03B 33/12 | (2006.01) |
| G02B 26/08 | (2006.01) |
| G03B 21/00 | (2006.01) |

(52) U.S. Cl.
CPC ......... *H04N 9/3105* (2013.01); *G02B 27/104* (2013.01); *G02B 27/126* (2013.01); *G02B 27/141* (2013.01); *G02B 27/142* (2013.01); *G03B 33/12* (2013.01); *G02B 26/0833* (2013.01); *G03B 21/008* (2013.01)

(58) Field of Classification Search
CPC .. G03B 21/008; G03B 21/2066; G02B 27/14; G02B 27/141; G02B 27/142; G02B 27/143; G02B 27/144; G02B 27/145; G02B 27/1006; G02B 27/1026; H04N 9/3158
See application file for complete search history.

(56) References Cited

U.S. PATENT DOCUMENTS

2008/0239501 A1* 10/2008 Saita ................. G02B 5/04
 359/634
2009/0086324 A1* 4/2009 Saita ................. G02B 27/1013
 359/589

FOREIGN PATENT DOCUMENTS

| JP | H10104763 A | 4/1998 |
| JP | H10319344 A | 12/1998 |
| JP | H11142992 A | 5/1999 |

OTHER PUBLICATIONS

DLP Tilt and Roll Pixel Architecture and DLP IntelliBrightTM <http://www.dlp.com/pico-projector/pico-product-developers/2trp-chip.aspx> (2 pages).

* cited by examiner

*Primary Examiner* — Christina Riddle
*Assistant Examiner* — Christopher Lamb, II
(74) *Attorney, Agent, or Firm* — Osha Liang LLP

(57) ABSTRACT

A prism unit that combines light in the three primary colors of R, G, and B on the same optical axis includes: a G-reflecting dichroic coating that reflects G light and passes R and B light; and an RB dichroic coating that reflects one of R and B, and passes the other one of R and B, the prism unit satisfying the following conditional expression: $\lambda rg \geq \lambda rb \geq 0.67 \times \lambda rg + 0.33 \times \lambda gb$, where $\lambda gb$ represents the wavelength at which the transmittance is 50% when the colors of G and B on the composite optical axis are combined, $\lambda rg$ represents the wavelength at which the transmittance is 50% when the colors of R and G on the composite optical axis are combined, and $\lambda rb$ represents the wavelength at which the transmittance is 50% when the colors of R and B on the composite optical axis are combined.

5 Claims, 10 Drawing Sheets

COMPARATIVE EXAMPLE 1 (G1-RB6)

COMPARATIVE EXAMPLE 2 (G3-RB7)

PRISM UNIT AND PROJECTOR

CROSS-REFERENCE TO RELATED APPLICATION(S)

The entire disclosure of Japanese Patent Application No. 2014-191149 filed on Sep. 19, 2014 including description, claims, drawings, and abstract are incorporated herein by reference in its entirety.

BACKGROUND OF THE INVENTION

Field of the Invention

The present invention generally relates to prism units and projectors, and more particularly, to a prism unit that combines light in the three colors of R (red), G (green), and B (blue) on the same optical axis, for example, and a three-plate projector including the prism unit.

Description of the Related Art

Digital micromirror devices are known as reflective display devices mounted on projectors. A digital micromirror device has an image display surface formed with minute micromirrors, and controls the tilt of each mirror surface on the image display surface, to modulate the intensity of illumination light and thus form an image. Switching on and off of each pixel of the digital micromirror device is expressed by ±12-degree rotation of the mirror surfaces about a rotational axis at an angle of 45 degrees with respect to each side of the image display surface (or micromirror drive about one axis), for example. As for micromirror movement, a digital micromirror device of a new operation type (Tilt & Roll Pixel DMD) that drives micromirrors with respect to two axes perpendicular to each other is suggested in DLP Tilt & Roll Pixel Architecture and DLP IntelliBright™, <URL:http://www.dlp.com/pico-projector/pico-product-developers/2trp-chip.aspx>.

In a projector that uses a reflective display device such as a digital micromirror device and a color separating/combining prism, the angles of incidence with respect to the dichroic coatings in the color separating/combining prism differ between illumination light and projection light (on-state light). Therefore, light loss is caused due to a difference in angular characteristics between the dichroic coatings. So as to reduce such light loss, JP 10-104763 A, JP 10-319344 A, and JP 11-142992 A suggest projectors in which the angles of light incidence with respect to dichroic coatings are adjusted.

In each of the projectors suggested in JP 10-104763 A, JP 10-319344 A, and JP 11-142992 A, a prism unit that first separates G from the three colors of R, G, and B is provided, and the separation cutoff between B and R is set almost at the center of the reflection band of G. A prism unit that first separates G is known as a prism unit for video optical systems, LCOS (reflective crystal liquid) projectors, and the like. In that color combination, only projection light should be taken into consideration, and therefore, the separation wavelength between B and R does not affect performance at any part of the G wavelength band.

For example, in a projector optical system compatible with digital micromirror devices of the above described new operation type, the angle of incidence at the time of separation/combination of B and R differs between the illumination light path and the projection light path. The cutoff wavelength varies with the angle of incidence in a dichroic coating. Therefore, if the rising wavelength position is set by using a BR dichroic coating having a film structure that takes into account only the projection light path, there is a possibility that efficiency will rapidly drop in the illumination light path. Therefore, with the angular characteristics of the dichroic coatings disclosed in JP 10-104763 A, JP 10-319344 A, and JP 11-142992 A, it is difficult to sufficiently reduce light loss in illumination light.

SUMMARY OF THE INVENTION

One aspect of the present invention provides a prism unit that has light loss reduced in both projection light and illumination light in the dichroic coatings, and has a high light use efficiency, and a projector that includes the prism unit.

A prism unit that combines light in the three primary colors of R, G, and B on the same optical axis, reflecting one aspect of the present invention, comprises: a G-reflecting dichroic coating that reflects G light and passes R and B light; and an RB dichroic coating that reflects one of R and B, and passes the other one of R and B, the prism unit satisfying the following conditional expression (1):

$$\lambda rg \geq \lambda rb \geq 0.67 \times \lambda rg + 0.33 \times \lambda gb \qquad (1)$$

where $\lambda gb$ represents the wavelength at which the transmittance is 50% when the colors of G and B on the composite optical axis are combined in the G-reflecting dichroic coating, $\lambda rg$ represents the wavelength at which the transmittance is 50% when the colors of R and G on the composite optical axis are combined in the G-reflecting dichroic coating, and $\lambda rb$ represents the wavelength at which the transmittance is 50% when the colors of R and B on the composite optical axis are combined in the RB dichroic coating.

According to one or more embodiments, the G-reflecting dichroic coating and the RB dichroic coating are formed from at least two vapor-deposited materials of a high-refractive-index material, an intermediate-refractive-index material, and a low-refractive-index material, the high-refractive-index material is $TiO_2$, or $Nb_2O_5$, or $Ta_2O_5$, the intermediate-refractive-index material is $Al_2O_3$ or a mixed oxide of $Al_2O_3$ and $La_2O_3$, and the low-refractive-index material is $SiO_2$.

A projector in accordance with one or more embodiments includes: the prism unit in accordance with one or more embodiments described above; three image display devices that display an R image, a G image, and a B image on respective image display surfaces; an illumination optical system that illuminates the respective image display surfaces; and a projection optical system that projects the images displayed on the respective image display surfaces onto a screen, wherein the prism unit is a color separating/combining prism that separates colors in illumination light and combines colors for projection light, the angle of incidence of principal illumination light with respect to the image display surfaces differs from the angle of emission of principal projection light with respect to the image display surfaces, and the angles of incidence of the principal projection light and the principal illumination light with respect to the G-reflecting dichroic coating are substantially the same.

According to one or more embodiments, the following conditional expressions (2A) and (2B) are satisfied:

$$\lambda irg \geq \lambda prb \geq 0.67 \times \lambda prg + 0.33 \times \lambda pgb \qquad (2A)$$

$$0.5 \times \lambda prg + 0.5 \times \lambda pgb > \lambda irb \geq \lambda pgb \qquad (2B)$$

where $\lambda irg$ represents the wavelength at which the transmittance is 50% when the colors of R and G in the principal illumination light are separated from each other in the G-reflecting dichroic coating, λprg represents the wavelength at which the transmittance is 50% when the colors of R and G in the principal projection light are combined in the G-reflecting dichroic coating, λirb represents the wavelength at which the transmittance is 50% when the colors of R and B in the principal illumination light are separated from each other in the RB dichroic coating, λprb represents the wavelength at which the transmittance is 50% when the colors of R and B in the principal projection light are combined in the RB dichroic coating, and λpgb represents the wavelength at which the transmittance is 50% when the colors of G and B in the principal projection light are combined in the G-reflecting dichroic coating.

According to one or more embodiments, the composite optical axis of the prism unit and the principal projection light coincide with each other.

BRIEF DESCRIPTION OF THE DRAWINGS

Various advantages and features of embodiments of the present invention will become more fully understood from the detailed description given hereinbelow and the appended drawings which are given by way of illustration only, and thus are not intended as a definition of the limits of the present invention, and wherein.

DESCRIPTION OF THE EMBODIMENTS

Hereinafter, embodiments of prism units and projectors of the present invention will be described with reference to the drawings. However, the scope of the invention is not limited to the illustrated examples.

Figure 1:
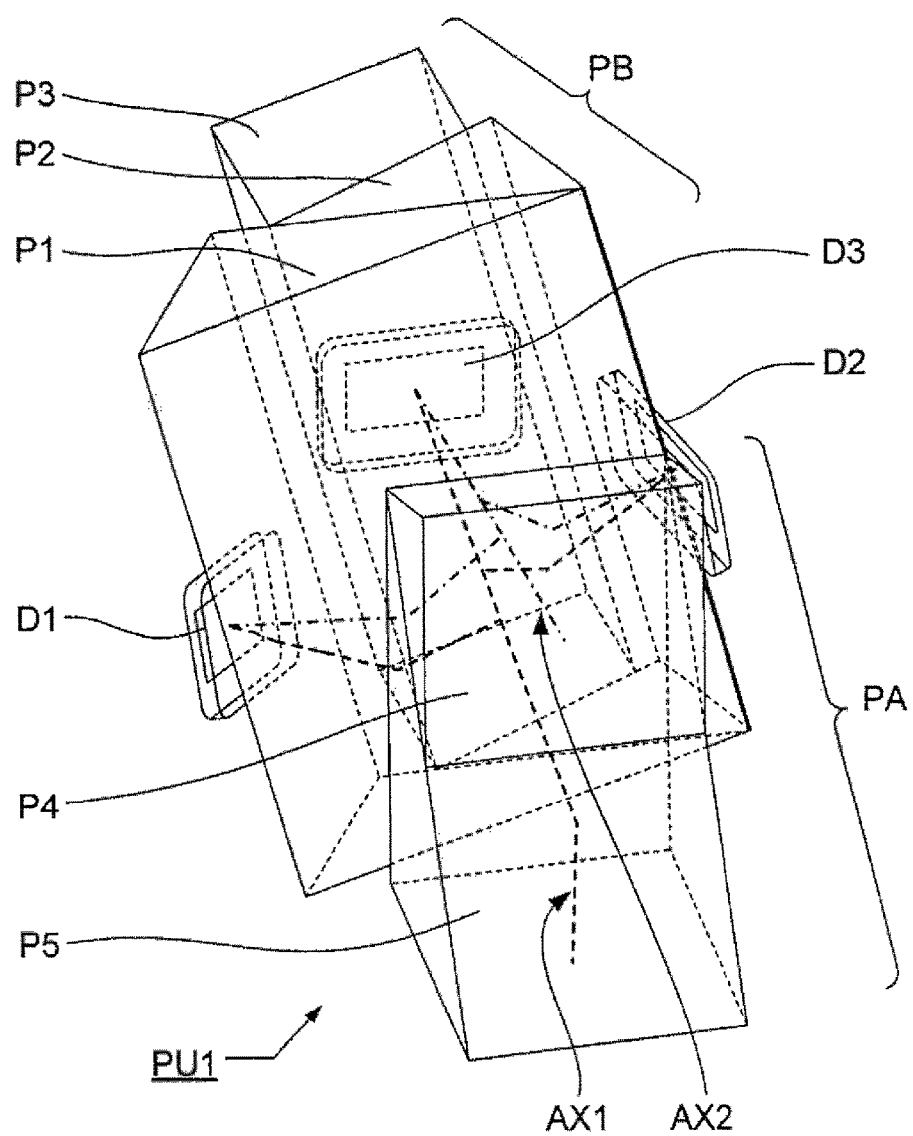
FIG. 1 is a perspective view of a prism unit in accordance with one or more embodiments.
Figure 2:
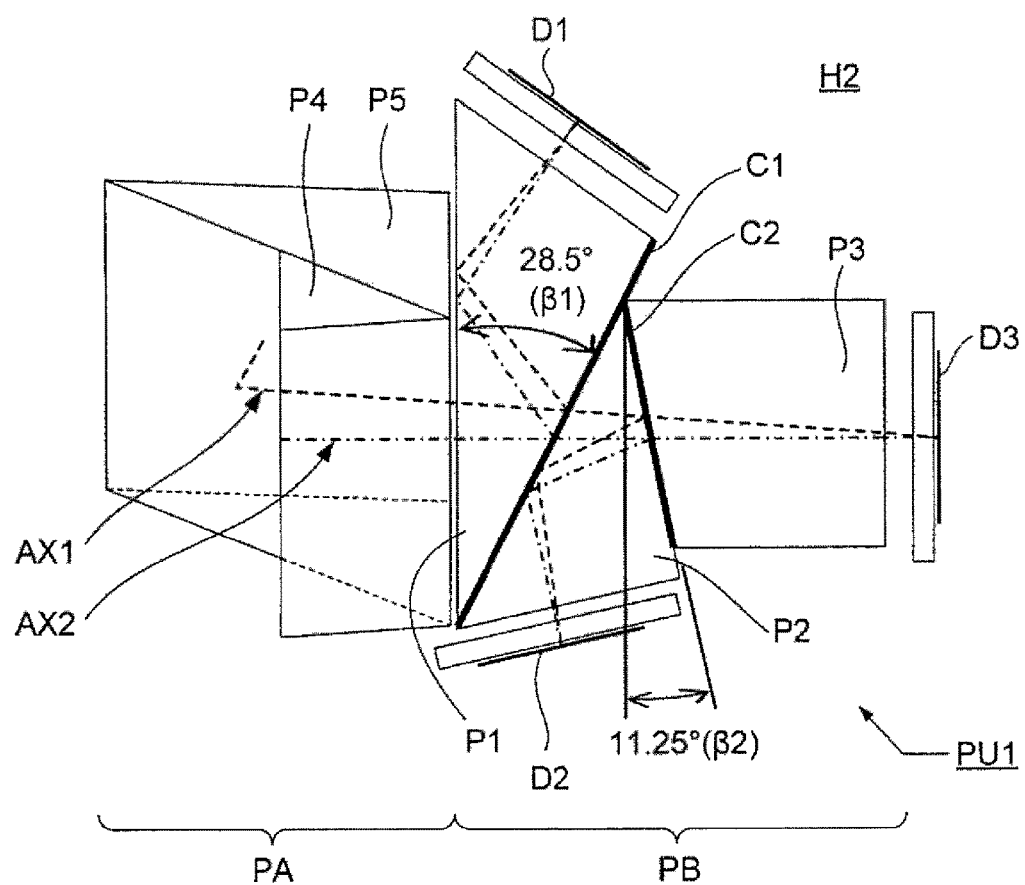
FIG. 2 is a top view of the prism unit shown in FIG. 1.
Figure 3:
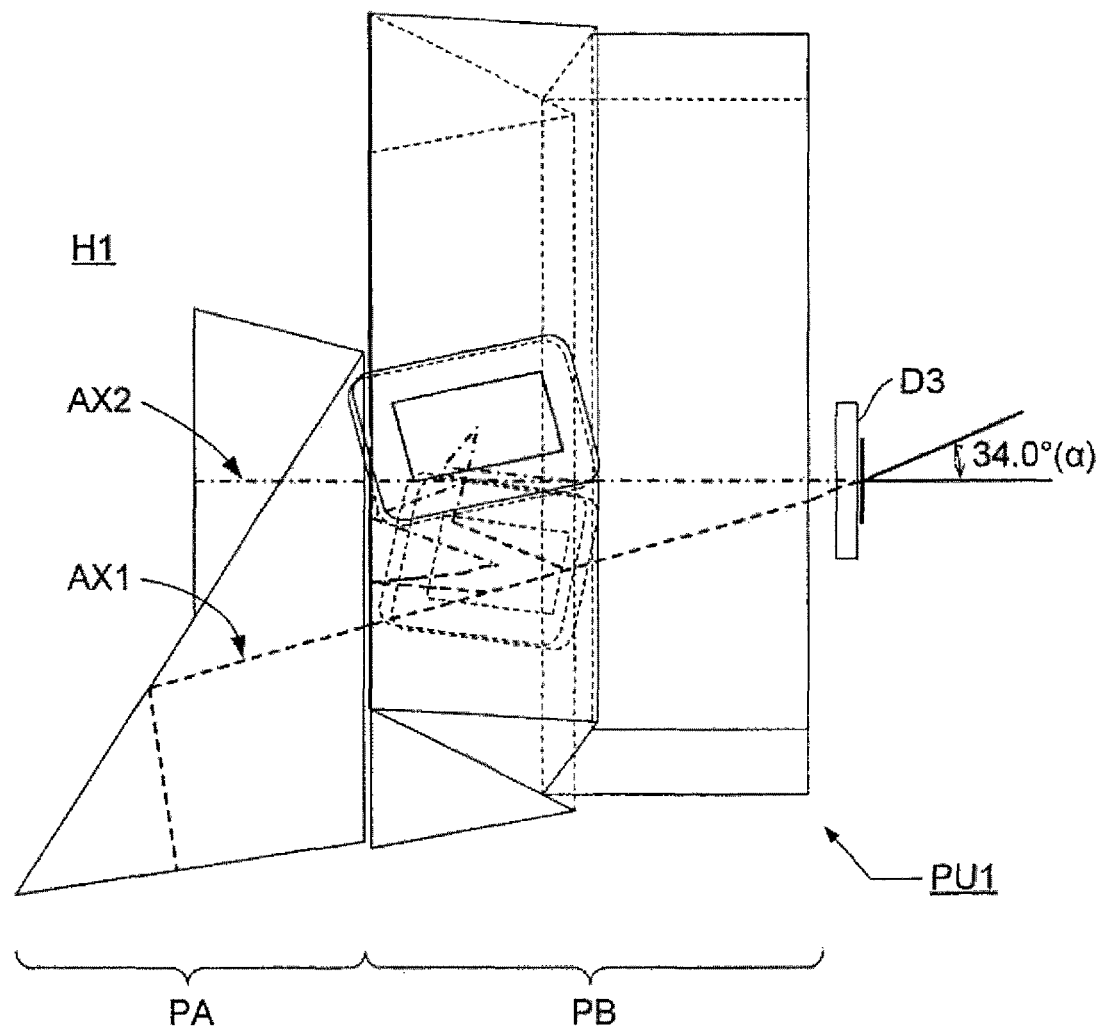
FIG. 3 is a side view of the prism unit shown in FIG. 1.
Figure 4:
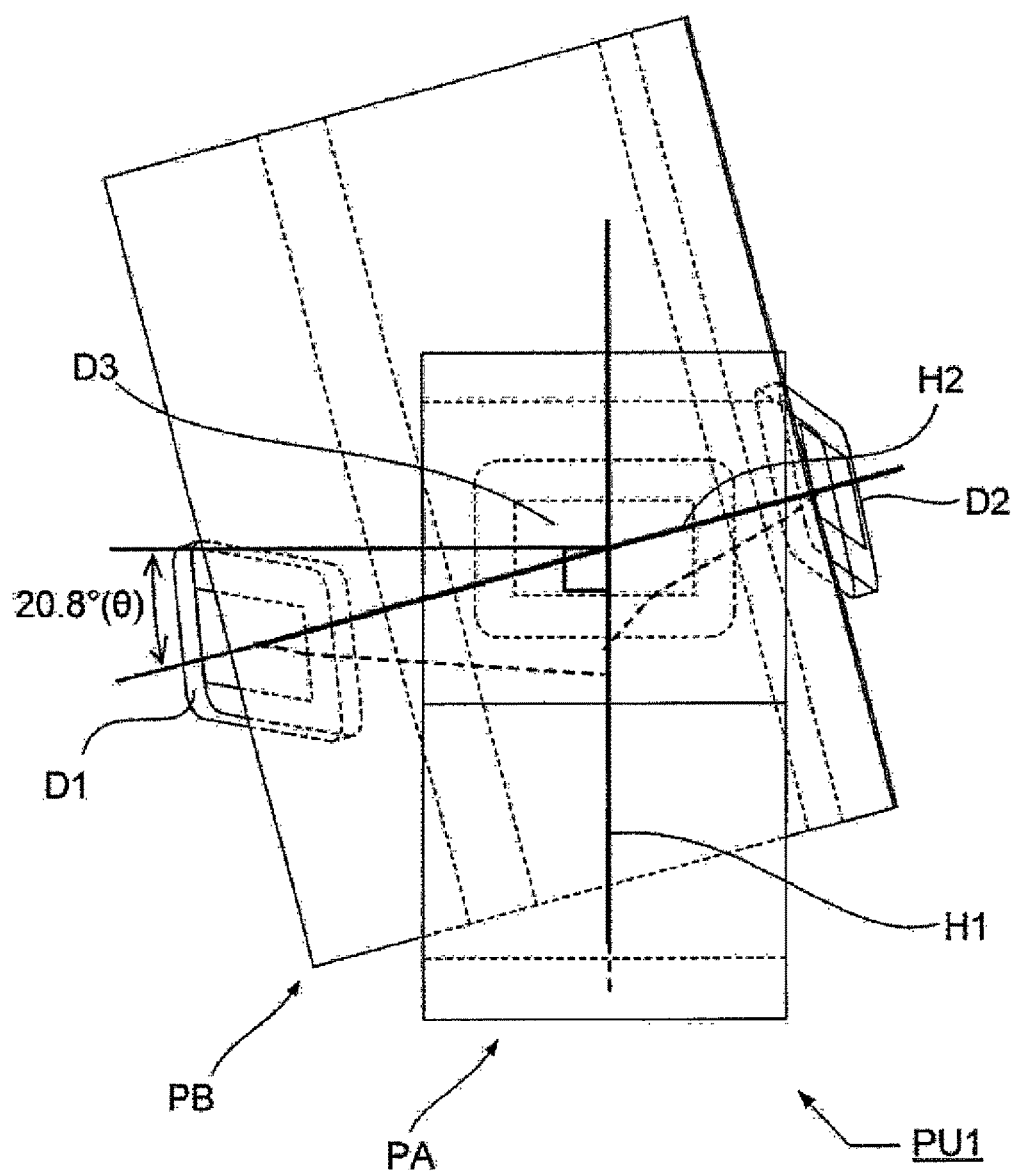
FIG. 4 is a front view of the prism unit shown in FIG. 1.
Figure 5:
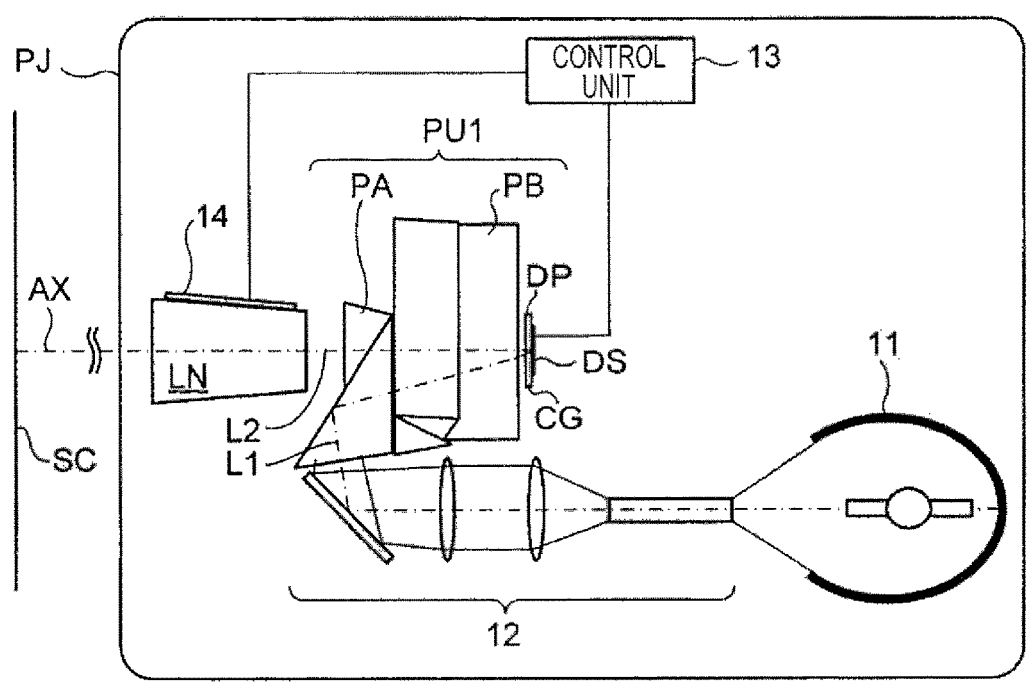
FIG. 5 is a schematic diagram showing an example structure of a projector on which the prism unit shown in FIG. 1 is mounted.

FIGS. 1 to 4 show an optical system PU1 that includes a color separating/combining prism PB as a prism unit in accordance with one or more embodiments. FIG. 1 shows the optical system PU1 as viewed from obliquely above, FIG. 2 shows the optical system PU1 as viewed from above, FIG. 3 shows the optical system PU1 as viewed from a side, and FIG. 4 shows the optical system PU1 as viewed from front. FIG. 5 shows a schematic example structure of a projector PJ on which the optical system PU1 is mounted. As shown in FIG. 5, the projector PJ includes a projection optical system LN, the optical system PU1, a light source 11, an illumination optical system 12, a control unit 13, and an actuator 14, and the optical system PU1 includes a TIR (Total Internal Reflection) prism PA, a color separating/combining prism PB, and a digital micromirror device DP. The entire projector PJ is controlled by the control unit 13.

As shown in FIG. 5, illumination light L1 emitted from the light source 11 is guided to the digital micromirror device DP by the illumination optical system 12, the TIR prism PA, and the color separating/combining prism PB. The digital micromirror device DP is a reflective display device that generates an image by modulating light, and has a cover glass CG on the image display surface DS that displays an image. On the image display surface DS of the digital micromirror device DP, a two-dimensional image is formed through illumination light intensity modulation.

The pixels of the conventionally-known digital micromirror device DP have a rotational axis at an angle of 45 degrees with respect to each side of the rectangular image display area formed by the image display surface DS, and rotationally move ±12 degrees about the axis, to express switching on and off. Only light reflected by micromirrors (pixel surfaces) in an on-state passes through the optical system PU1 and the projection optical system LN, as will be described later. In the case of a digital micromirror device of the new operation type (see DLP Tilt & Roll Pixel Architecture and DLP IntelliBright™, <URL:http://www.dlp.com/pico-projector/pico-product-developers/2trp-chip.aspx>), on the other hand, mirror surfaces do not rotate about one rotational axis, but rotate about two rotational axes perpendicular to each other.

Figure 6:
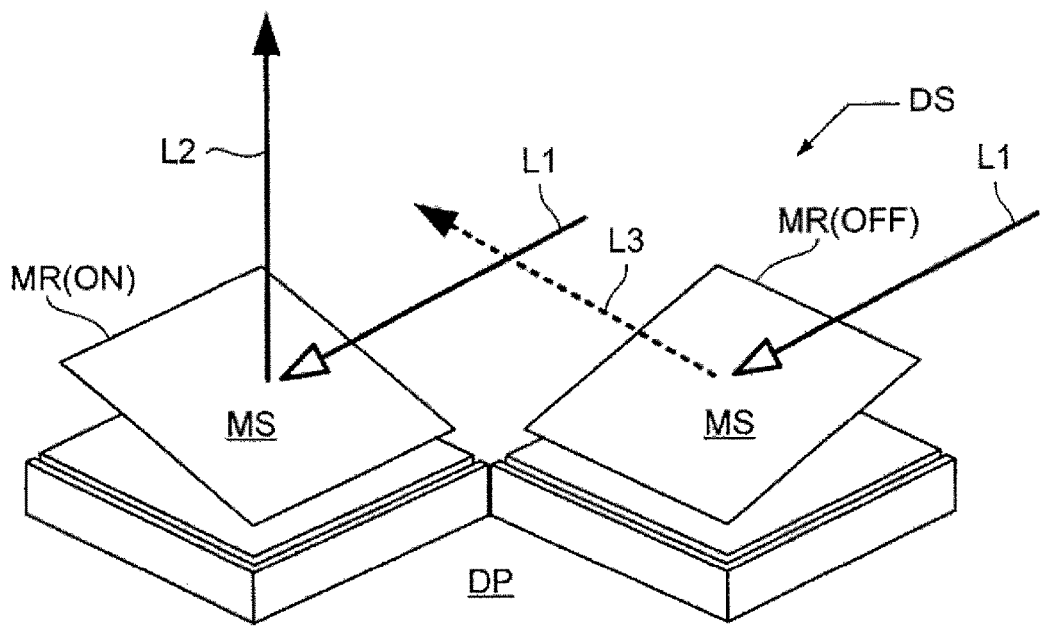
FIG. 6 is a perspective view for explaining the operation of a digital micromirror device that performs micromirror drive with respect to two axes perpendicular to each other, in accordance with one or more embodiments.
Figure 7:
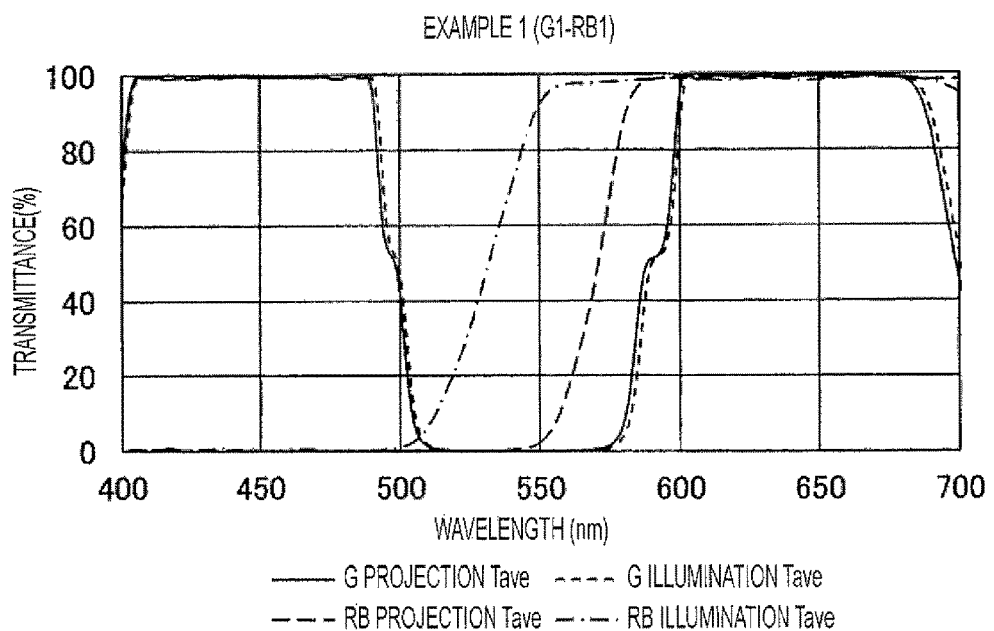
FIG. 7 is a graph showing the spectral transmission characteristics of first and second dichroic coatings in a prism unit of Example 1.
Figure 8:
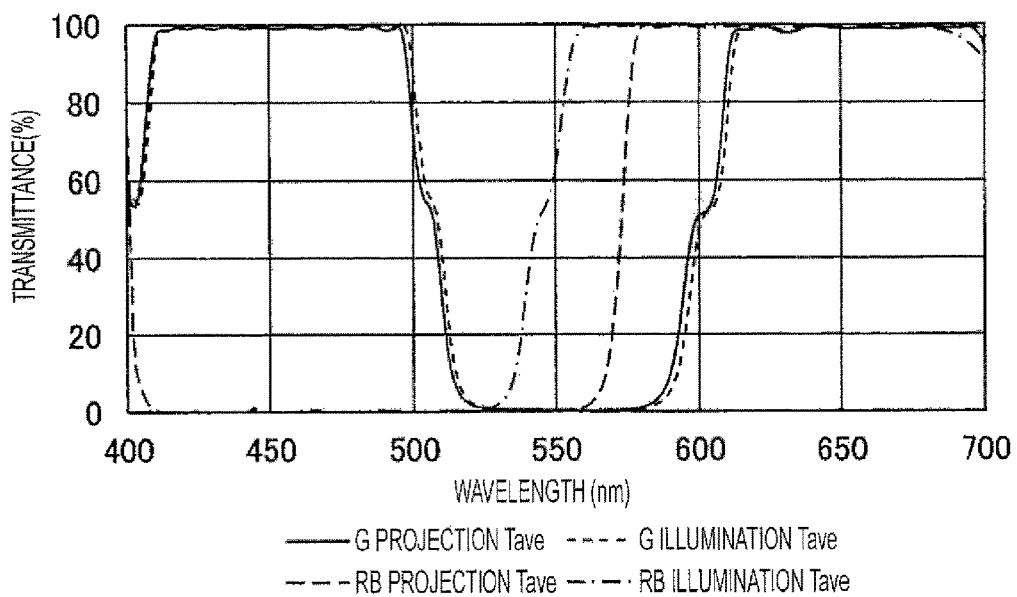
FIG. 8 is a graph showing the spectral transmission characteristics of first and second dichroic coatings in a prism unit of Example 2.
Figure 9:
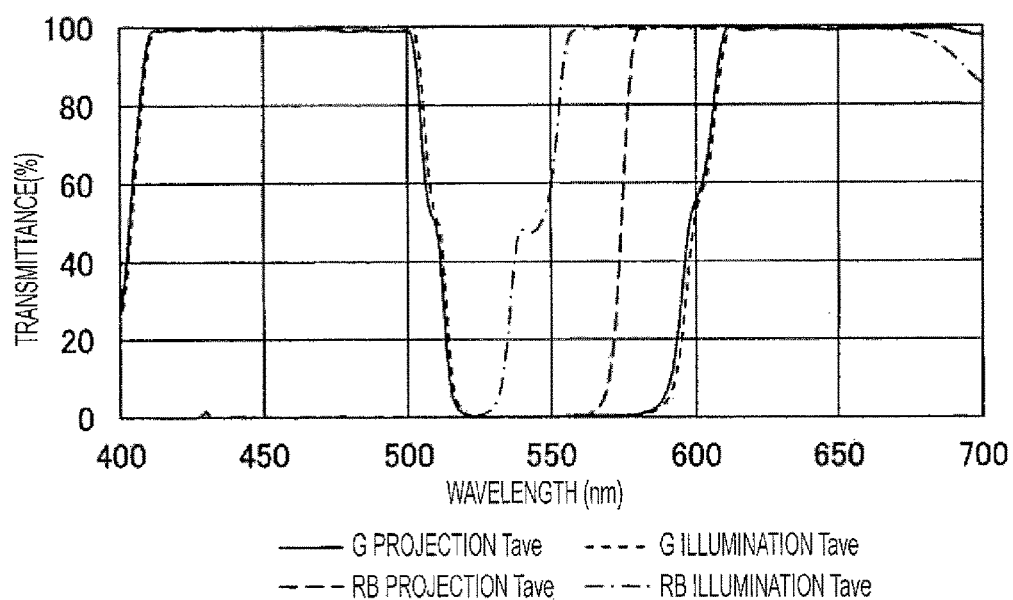
FIG. 9 is a graph showing the spectral transmission characteristics of first and second dichroic coatings in a prism unit of Example 3.
Figure 10:
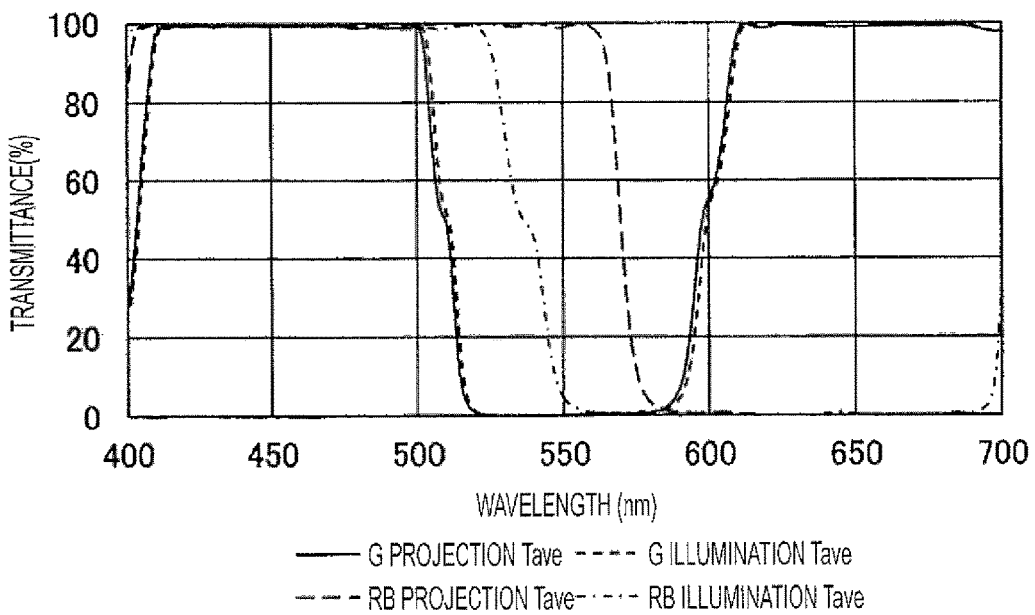
FIG. 10 is a graph showing the spectral transmission characteristics of first and second dichroic coatings in a prism unit of Example 4.
Figure 11:
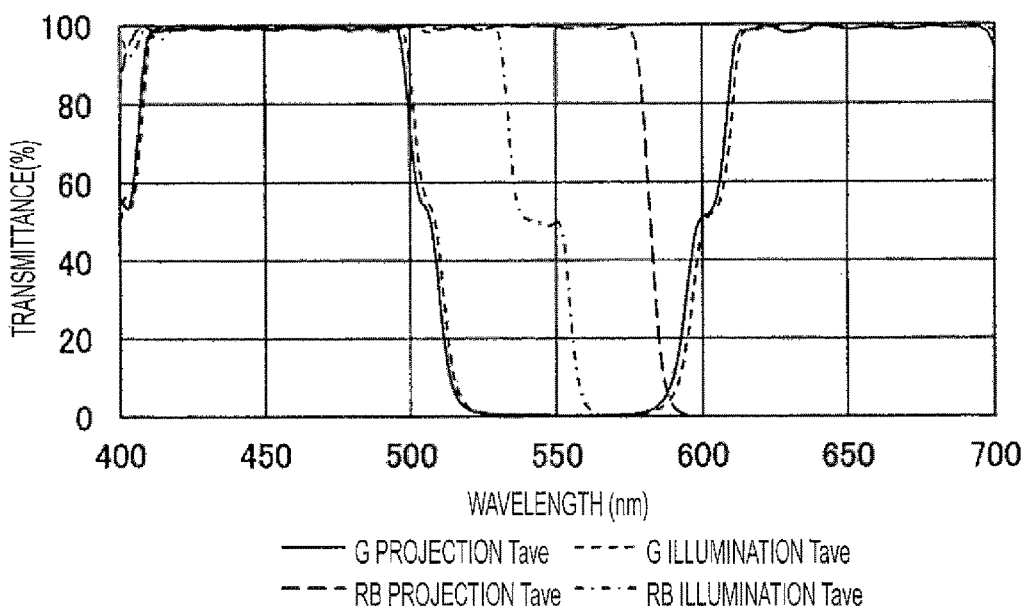
FIG. 11 is a graph showing the spectral transmission characteristics of first and second dichroic coatings in a prism unit of Example 5.
Figure 12:
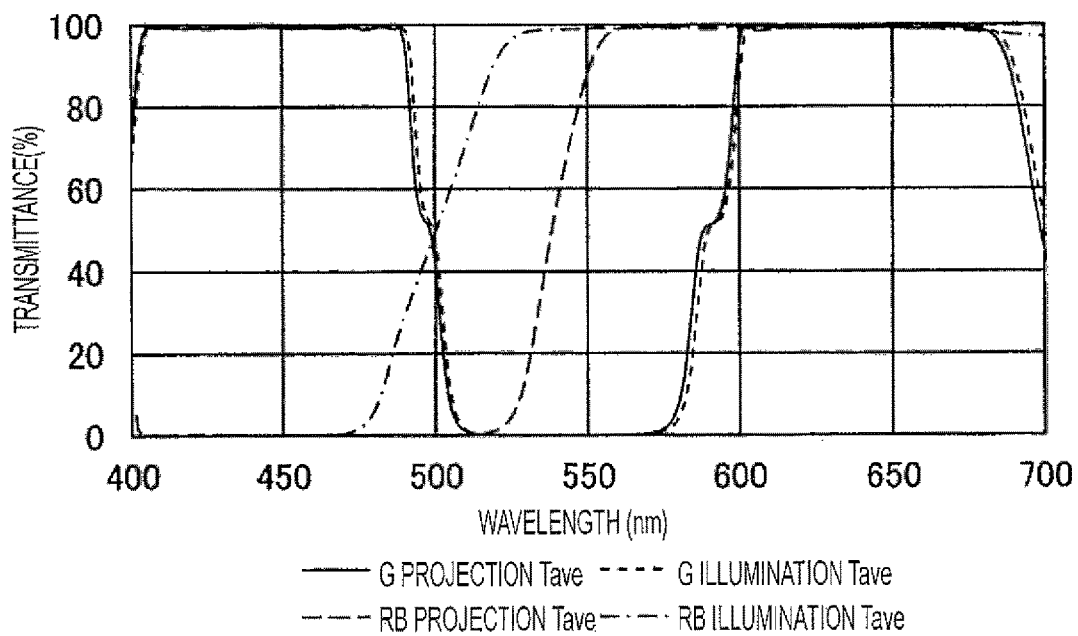
FIG. 12 is a graph showing the spectral transmission characteristics of first and second dichroic coatings in a prism unit of Comparative Example 1.
Figure 13:
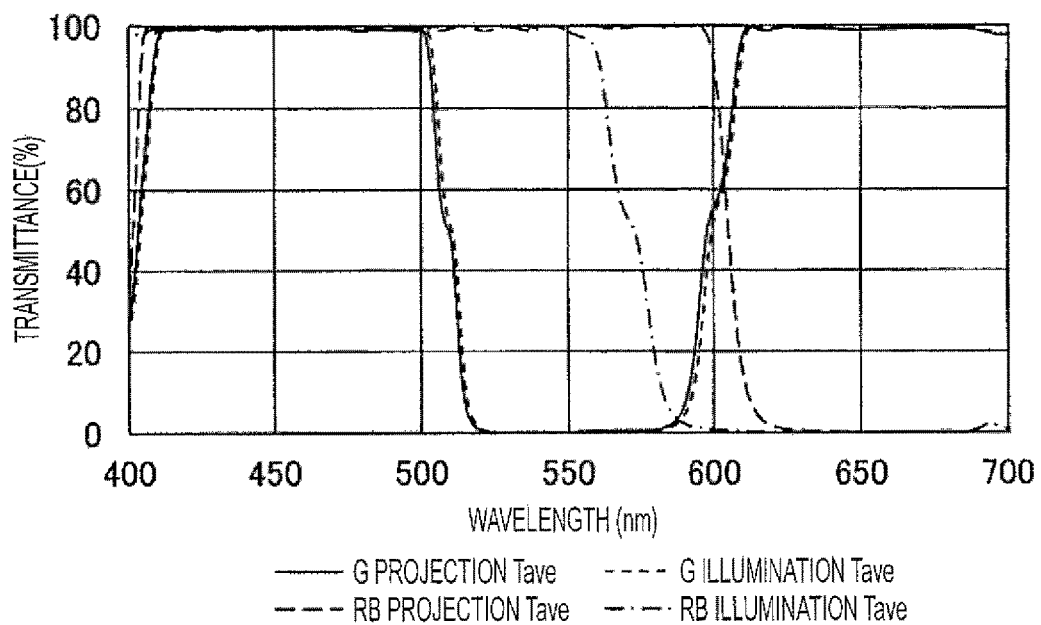
FIG. 13 is a graph showing the spectral transmission characteristics of first and second dichroic coatings in a prism unit of Comparative Example 2.

FIG. 6 shows the feature of a digital micromirror device DP of the new operation type, or an on-state and an off-state of a pixel formed with the rectangular pixel reflecting surface (micromirror surface) MS of a micromirror MR. On the image display surface DS formed with pixel reflecting surfaces MS in the digital micromirror device DP (FIG. 6), switching on and off of each pixel reflecting surface MS is controlled, and the micromirrors MR switch between two angles: an image display state (on-state) and an image non-display state (off-state). In this manner, the intensity of illumination light L1 is modulated, and a desired image can be formed.

As described above, micromirror drive is performed with respect to two axes perpendicular to each other. Therefore, as can be seen from FIG. 6, the pixel reflecting surface MS of a micromirror MR is in an on-state when tilted to one side, and is in an off-state when tilted to a side perpendicular to the one side. In generally-conceivable on/off control, when the pixel reflecting surface MS is in an on-state, the illumination light L1 that has entered the micromirror MR is reflected in the normal direction of the image display surface DS, and turns into on-state light (projection light) L2. When the pixel reflecting surface MS is in an off-state, the illumination light L1 that has entered the micromirror MR is reflected in a direction at a large angle with respect to the normal direction of the image display surface DS, and turns into off-state light (unnecessary light) L3.

The optical system PU1 is a three-plate image projection optical system as shown in FIGS. 1 to 4. That is, the optical system PU1 is a prism system that includes a prism optical system formed with the TIR prism PA and the color separating/combining prism PB, and first to third digital micromirror devices D1 to D3 (equivalent to the digital micromirror device DP in FIG. 5), and separates the illumination light L1 and the projection light L2 from each other, and the projection light (on-state light) L2 and unnecessary light (off-state light) (not shown) from each other. An image displayed on the digital micromirror device DP is enlarged and projected on a screen SC by the projection optical system LN. Movement (such as zooming or focusing) of the projection optical system LN or part of the projection optical system LN is conducted by the actuator 14 (FIG. 5).

In the optical system PU1 (FIGS. 1 to 5), the TIR prism PA is formed with fourth and fifth prisms P4 and P5 each having the shape of a triangular prism, and an air gap layer is provided between the tilted surfaces of the prisms. With this TIR prism PA, the illumination light (input light) L1 for and the projection light (output light) L2 from the first to third digital micromirror devices D1 to D3 are separated from each other. Illumination light L1 emitted from the illumination optical system 12 enters the fifth prism P5 of the TIR prism PA, enters the tilted surface forming the air gap layer between the fourth and fifth prisms P4 and P5 at an angle that satisfies the total reflection conditions, is totally reflected, and enters the color separating/combining prism PB.

In the optical system PU1, the color separating/combining prism PB is formed with three prisms P1, P2, and P3, to be compatible with the three primary colors: R (red), G (green), and B (blue). As the digital micromirror device DP (FIG. 5), the first, second, and third digital micromirror devices D1, D2, and D3 that are used for light in the respective colors of red, green, and blue, and the illumination light L1 is separated into the respective colors of red, green, and blue by the color separating/combining prism PB.

The three prisms P1, P2, and P3 constituting the color separating/combining prism PB are two triangular prisms and one block-like prism. A first dichroic coating C1 (FIG. 2) that reflects first-color light, and an air gap layer adjacent to the first dichroic coating C1 are provided between the first prism P1 and the second prism P2. A second dichroic coating C2 (FIG. 2) that reflects second-color light, and an air gap layer adjacent to the second dichroic coating C2 are provided between the second prism P2 and the third prism P3. In FIG. 2, $\beta1$ and $\beta2$ represents the angles between the surface normals of the first and second dichroic coatings C1 and C2, and the normal line of the image display surface DS of the third digital micromirror device D3 (this normal line is located parallel to the projection optical axis AX2).

Of the illumination light L1 (FIG. 5) that has entered the first prism P1 of the color separating/combining prism PB, the first-color light is reflected by the first dichroic coating C1 (FIG. 2), and the second-color light and third-color light pass through the first dichroic coating C1. The first-color light reflected by the first dichroic coating C1 is totally reflected, is then emitted from the color separating/combining prism PB, and illuminates the first digital micromirror device D1. Of the second- and third-color light that has passed through the first dichroic coating C1, the second-color light is reflected by the second dichroic coating C2 (FIG. 2), and the third-color light passes through the second dichroic coating C2.

The second-color light reflected by the second dichroic coating C2 is totally reflected, is then emitted from the color separating/combining prism PB, and illuminates the second digital micromirror device D2. The third-color light that has passed through the second dichroic coating C2 is emitted from the color separating/combining prism PB, and illuminates the third digital micromirror device D3. In FIG. 3, a represents the angle of incidence of the illumination light L1 with respect to the third digital micromirror device D3.

The projection light L2 (FIG. 5) formed with the first-color light reflected by the first digital micromirror device D1 enters the color separating/combining prism PB, is totally reflected, and is then reflected by the first dichroic coating C1. The projection light L2 formed with the second-color light reflected by the second digital micromirror device D2 enters the color separating/combining prism PB, is totally reflected, is then reflected by the second dichroic coating C2, and further passes through the first dichroic coating C1. The projection light L2 formed with the third-color light reflected by the third digital micromirror device D3 enters the color separating/combining prism PB, and passes through the second dichroic coating C2 and the first dichroic coating C1. In this manner, of the light emitted from the three digital micromirror devices D1 to D3 that have received the illumination light L1, the projection light L2 to be used in image projection is formed through color combination performed in the first and second dichroic coatings C1 and C2.

In the optical system PU1, the projection light L2 formed with light in the respective colors of red, green, and blue is formed on the same optical axis (equivalent to the projection optical axis AX2 in FIGS. 1 to 3, and the optical axis AX in FIG. 5), and is emitted from the color separating/combining prism PB, to enter the TIR prism PA. The projection light L2 that has entered the TIR prism PA does not satisfy the total reflection conditions at this point, and therefore, passes through the air gap layer, to be projected onto the screen SC by the projection optical system LN. The prism optical system including the color separating/combining prism PB that separates and combines the three colors of R, G, and B can be used not only in an image display apparatus (such as a projector) but also in an image recording apparatus (such as a video camera).

As shown in FIGS. 2 to 4, the plane including the illumination optical axis AX1 and the projection optical axis AX2 on the image display surface DS of the third digital micromirror device D3 is a first plane H1, and the plane including the surface normals of the first and second dichroic coatings C1 and C2 and the surface normal extending through the center of the third digital micromirror device D3 is a second plane H2. In the optical system PU1, the first plane H1 and the second plane H2 are located not to be perpendicular to each other, as shown in FIG. 4. Specifically, the first plane H1 and the second plane H2 perpendicular to each other have rotated in a relative manner in such a direction that the angle of incidence of the illumination optical axis AX1 with respect to the first dichroic coating C1 or the second dichroic coating C2 becomes smaller. In FIG. 4, $\theta$ (=20.8°) indicates the angle of rotation from the state where the first plane H1 and the second plane H2 are perpendicular to each other.

If the angles of incidence with respect to the dichroic coating surfaces vary between the illumination light path and the projection light path, a difference appears between the spectral characteristics of the coatings. If the angles of incidence become larger, the spectral characteristics generally shift to the shorter wavelength side, and the cutoff wavelength becomes shorter. If the difference between the spectral characteristics of the illumination light path and the projection light path becomes larger, there are wavelengths with different reflection-transmission conditions between the illumination light path and the projection light path, and light at the wavelengths turn into stray light in the prisms, resulting in an increase in light loss and a decrease in light use efficiency. To counter this, in the optical system PU1 (FIGS. 1 to 4), the first plane H1 and the second plane H2 perpendicular to each other have rotated in a relative manner in such a direction that the angle of incidence of the illumination optical axis AX1 with respect to the first dichroic coating C1 or the second dichroic coating C2 becomes smaller, as described above. With this structure, the angle of incidence of the illumination light L1 with respect to the first or second dichroic coating C1 or C2 varies depending on the relative tilt of each of the first and second planes H1 and H2 with respect to the other. Therefore, the first dichroic coating C1 reflects G light so that the angle of incidence becomes substantially the same between the illumination light path and the projection light path. As a result, the cutoff wavelength can be appropriately set in the second dichroic coating C2, and the light use efficiency can be made higher.

More preferably, in one or more embodiments, the first plane H1 and the second plane H2 perpendicular to each other have rotated in a relative manner in such a direction that the angles of incidence of the illumination light L1 and the projection light L2 with respect to the first dichroic coating C1 become smaller.

There are various conceivable sequences of separation and combination of the three colors of R, G, and B. In a case where the color separating/combining prism PB separates the G light before separating the R light and the B light from each other, the G light is separated from the R light and the B light in the first dichroic coating C1, and the R light and the B light are separated from each other in the second dichroic coating C2. That is, the first-color light (G) in the green wavelength band is reflected by the first dichroic coating C1. The second-color light (B or R) in the blue wavelength band is reflected by the second dichroic coating C2, and the third-color light (R or B) in the red wavelength band passes through the second dichroic coating C2.

As described above, the first dichroic coating C1 may reflect the color light (G) in the green wavelength band. Alternatively, the second dichroic coating C2 reflects the color light (B) in the blue wavelength band and passes the color light (R) in the red wavelength band, or reflects the color light (R) in the red wavelength band and passes the color light (B) in the blue wavelength band. In this structure, the green wavelength band is first separated, and the blue wavelength band and the red wavelength band are then separated from each other in the band. Accordingly, even if the angular characteristics become larger in the second dichroic coating C2, the structure is not affected by that.

With the above described change in the angle of incidence of the illumination light L1, the maximum angle of incidence with respect to the first or second dichroic coating C1 or C2 is reduced, and light loss due to the coat spectral characteristics caused by a difference between the angles of incidence of the illumination light L1 and the projection light L2 with respect to the first or second dichroic coating C1 or C2 (or light loss in the color separating/combining prism PB) can be reduced. Accordingly, with a small and simple structure, light loss in the dichroic coatings C1 and C2 can be reduced, and luminance efficiency can be increased. As this optical system PU1 is included in the projector PJ (FIG. 5), the three-plate projector PJ can be made smaller in size and lower in costs, and a high light use efficiency can be achieved.

Specifically, a prism unit that combines light in the three primary colors of R, G, and B on the same optical axis includes: a G-reflecting dichroic coating that reflects G light and passes R and B light; and an RB dichroic coating that reflects one of R and B, and passes the other one of R and B. According to one or more embodiments, this prism unit satisfies the following conditional expression:

$$\lambda rg \geq \lambda rb \geq 0.67 \times \lambda rg + 0.33 \times \lambda gb \quad (1)$$

Here, λgb represents the wavelength at which the transmittance is 50%; when the colors of G and B on the composite optical axis are combined in the G-reflecting dichroic coating, λrg represents the wavelength at which the transmittance is 50% when the colors of R and G on the composite optical axis are combined in the G-reflecting dichroic coating, and λrb represents the wavelength at which the transmittance is 50% when the colors of R and B on the composite optical axis are combined in the RB dichroic coating.

In the structure that satisfies the conditional expression (1), the cutoff wavelength of the second dichroic coating C2 rises in the G wavelength region at both of the angles of incidence of the projection light path and the illumination light path. Accordingly, light loss can be effectively reduced both in the projection light L2 and the illumination light L1, and luminance can be further increased.

The G-reflecting dichroic coating and the RB dichroic coating are formed from at least two vapor-deposited materials of a high-refractive-index material, an intermediate-refractive-index material, and a low-refractive-index material. The high-refractive-index material may be $TiO_2$, $Nb_2O_5$, or $Ta_2O_5$, the intermediate-refractive-index material may be $Al_2O_3$ or a mixed oxide of $Al_2O_3$ and $La_2O_3$, and the low-refractive-index material may be $SiO_2$. As these refractive index materials are used in the G-reflecting dichroic coating and the RB dichroic coating, light loss in the first and second dichroic coatings C1 and C2 can be reduced, and luminance efficiency can be increased.

A projector in accordance with one or more embodiments includes: a prism unit; three image display devices that display an R image, a G image, and a B image on respective image display surfaces; an illumination optical system that illuminates the respective image display surfaces; and a projection optical system that projects the images displayed on the respective image display surfaces onto a screen. This prism unit is a color separating/combining prism that separates the colors in illumination light and combines colors for projection light. The angle of incidence of principal illumination light with respect to the image display surfaces differs from the angle of emission of principal projection light with respect to the image display surfaces. In this projector, the angles of incidence of the principal projection light and the principal illumination light with respect to the G-reflecting dichroic coating are substantially the same. The range of the angles of incidence is a range of a few degrees, such as a range of ±1 degrees. The composite optical axis of the prism unit and the principal projection light coincide with each other.

The above projector satisfies the following conditional expressions (2A) and (2B):

$$\lambda irg \geq \lambda prb \geq 0.67 \times \lambda prg + 0.33 \times \lambda pgb \quad (2A)$$

$$0.5 \times \lambda prg + 0.5 \times \lambda pgb > \lambda irb \geq \lambda pgb \quad (2B)$$

Here, λirg represents the wavelength at which the transmittance is 50% when the colors of R and G in the principal illumination light are separated from each other in the G-reflecting dichroic coating, λprg represents the wavelength at which the transmittance is 50% when the colors of R and G in the principal projection light are combined in the G-reflecting dichroic coating, λirb represents the wavelength at which the transmittance is 50% when the colors of R and B in the principal illumination light are separated from each other in the RB dichroic coating, λprb represents the wavelength at which the transmittance is 50% when the colors of R and B in the principal projection light are combined in the RB dichroic coating, and λpgb represents the wavelength at which the transmittance is 50% when the colors of G and B in the principal projection light are combined in the G-reflecting dichroic coating.

In the structure that satisfies the conditional expressions (2A) and (2B), the cutoff wavelength of the second dichroic coating C2 rises in the G wavelength region at both of the angles of incidence of the projection light path and the illumination light path. Accordingly, light loss can be effectively reduced both in the projection light L2 and the illumination light L1, and luminance can be further increased.

EXAMPLES

In the description below, the structures of optical systems according to one or more embodiments of the present invention are described as Examples 1 to 5 and Comparative Examples 1 and 2 in details.

Tables 1 to 20 show the film structures of G-reflecting dichroic coatings G1 to G3, and RB dichroic coatings RB1 to RB7. Each of the film structures shown in Tables 1 to 20 indicates, from the leftmost column, the layer number of each layer, the film forming material of each layer, the physical thickness (nm) of each layer, the refractive index of each layer, and the optical thickness of each layer (the principal design wavelength λ0=550 nm).

Example 1 includes the G-reflecting dichroic coating G1 as the first dichroic coating C1, and the RB dichroic coating RB1 as the second dichroic coating C2. Example 2 includes the G-reflecting dichroic coating G2 as the first dichroic coating C1, and the RB dichroic coating RB2 as the second dichroic coating C2. Example 3 includes the G-reflecting dichroic coating G3 as the first dichroic coating C1, and the RB dichroic coating RB3 as the second dichroic coating C2. Example 4 includes the G-reflecting dichroic coating G3 as the first dichroic coating C1, and the RB dichroic coating RB4 as the second dichroic coating C2. Example 5 includes the G-reflecting dichroic coating G2 as the first dichroic coating C1, and the RB dichroic coating RB5 as the second dichroic coating C2.

Comparative Example 1 includes the G-reflecting dichroic coating G1 as the first dichroic coating C1, and the RB dichroic coating RB6 as the second dichroic coating C2. Comparative Example 2 includes the G-reflecting dichroic coating G3 as the first dichroic coating C1, and the RB dichroic coating RB7 as the second dichroic coating C2.

Table 21 shows the plane angles β1 and β2 (°) of the first and second dichroic coatings C1 and C2, and the angles (°) of incidence of the illumination light L1 and the projection light L2 with respect to the first and second dichroic coatings C1 and C2. In Table 21, each angle (°) is shown as an angle in glass and an angle in the air. Table 22 shows the values according to the respective conditional expressions and related data in Examples 1 to 5 and Comparative Examples 1 and 2. Table 23 shows the states according to the respective conditional expressions (○ or x). As can be seen from Table 23, Comparative Example 1 satisfies the conditional expression (2B), but Comparative Example 2 does not satisfy the conditional expression (2B).

The graphs in FIGS. 7 to 13 show the spectral transmittances (%) in Examples 1 to 5 and Comparative Examples 1 and 2. In each of the graphs, the solid line (G projection Tave) indicates the transmittance of the projection light L2 (or the mean value of s-polarized light and p-polarized light) in the G-reflecting dichroic coating, and the dotted line (G illumination Tave) indicates the transmittance of the illumination light L1 (or the mean value between s-polarized light and p-polarized light) in the G-reflecting dichroic coating. The dashed line (RB projection Tave) indicates the transmittance of the projection light L2 (or the mean value of s-polarized light and p-polarized light) in the AB dichroic coating, and the dot-and-dash line (RB illumination Tave) indicates the transmittance of the illumination light L1 (or the mean value between s-polarized light and p-polarized light) in the RB dichroic coating.

In each of Examples 1 to 3 and Comparative Example 1, the RB dichroic coating forming the second dichroic coating C2 (FIG. 2) reflects the B light (the second-color light), and passes the R light (the third-color light). In each of Examples 4 and 5, and Comparative Example 2, the RB dichroic coating forming the second dichroic coating C2 (FIG. 2) reflects the R light (the second-color light), and passes the B light (the third-color light).

Example 1 and Comparative Example 1 each include the G-reflecting dichroic coating G1 as the first dichroic coating C1. As can be seen from a comparison between Example 1 and Comparative Example 1, in Comparative Example 1, the dot-and-dash line (RB illumination Tave) extends into the B region, and therefore, light loss occurs on the long-wavelength side of the B region. Meanwhile, a comparison between Example 4 and Comparative Example 2 each including the G-reflecting dichroic coating G3 as the first dichroic coating C1 shows that, in Comparative Example 2, the dashed line (RB projection Tave) extends into the R region, and therefore, light loss occurs on the short-wavelength side of the R region. That is, Comparative Example 1 is an example in which a rise in the RB dichroic coating occurs on short-wavelength side of the G region, and Comparative Example 2 is an example in which a rise in the RB dichroic coating occurs on the long-wavelength side of the G region.

Figure 14:
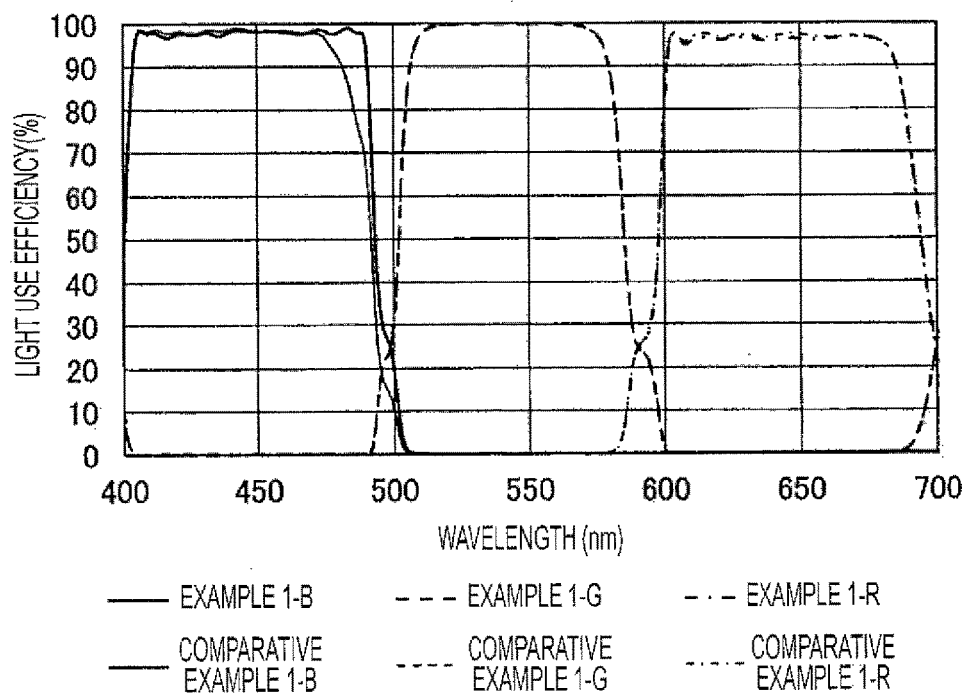
FIG. 14 is a graph showing the light use efficiencies in the prism units of Example 1 and Comparative Example 1.
Figure 15:
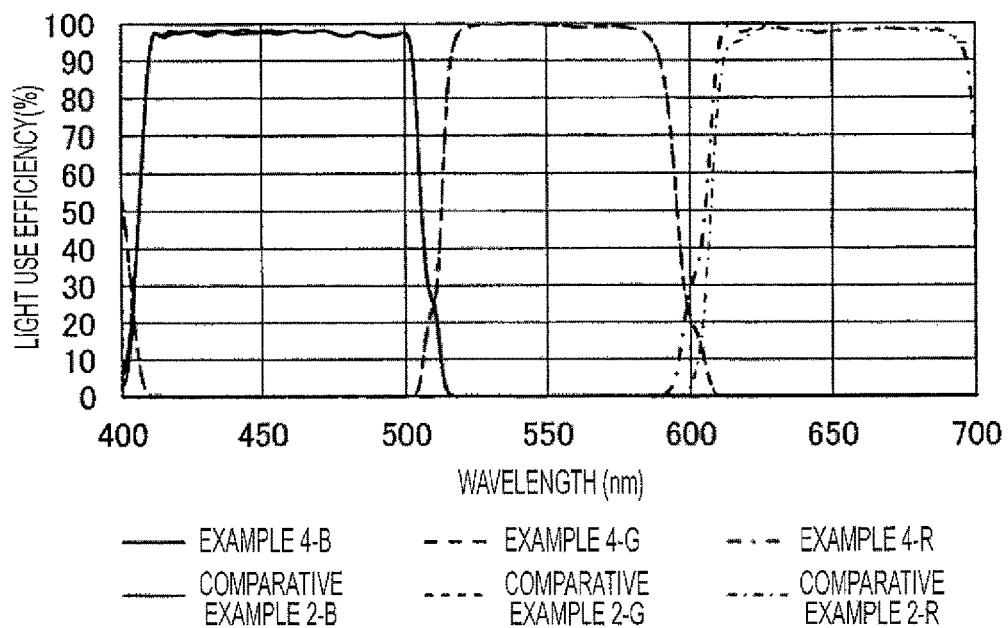
FIG. 15 is a graph showing the light use efficiencies in the prism units of Example 4 and Comparative Example 2.

The graphs in FIGS. 14 and 15 show the light use efficiencies in the respective color separating/combining prisms PB (the RGB light use efficiencies depending on the characteristics of the respective dichroic coatings). FIG. 14 shows the light use efficiencies in the color separating/combining prisms PB of Example 1 and Comparative Example 1. FIG. 15 shows the light use efficiencies in the color separating/combining prisms PB of Example 4 and Comparative Example 2. In each of the graphs in FIGS. 14 and 15, the solid line represents the B light, the dashed line represents the G light, the dot-and-dash line represents the R light, the bold line represents Example 1 or 4, and the thin line represents Comparative Example 1 or 2.

As can be seen from the graph in FIG. 14, compared with Comparative Example 1, Example 1 has a light use efficiency improved on the long-wavelength side of the B region. As can be seen from the graph in FIG. 15, compared with Comparative Example 2, Example 4 has a light use efficiency improved on the short-wavelength side of the R region.

TABLE 1

G-reflecting dichroic coating G1 (Principal design wavelength: $\lambda_0$ = 550 nm)

| Layer number | Material | Physical thickness (nm) | Refractive index | Optical thickness |
|---|---|---|---|---|
| | Prism substrate | | 1.52 | |
| 1 | $La_{0.5}Al_{1.5}O_3$ | 196.26 | 1.74 | 0.620 $\lambda_0$ |
| 2 | $Nb_2O_5$ | 182.43 | 2.38 | 0.788 $\lambda_0$ |
| 3 | $La_{0.5}Al_{1.5}O_3$ | 34.38 | 1.74 | 0.109 $\lambda_0$ |
| 4 | $Nb_2O_5$ | 88.81 | 2.38 | 0.384 $\lambda_0$ |
| 5 | $La_{0.5}Al_{1.5}O_3$ | 75.14 | 1.74 | 0.237 $\lambda_0$ |
| 6 | $Nb_2O_5$ | 83.22 | 2.38 | 0.360 $\lambda_0$ |
| 7 | $La_{0.5}Al_{1.5}O_3$ | 36.43 | 1.74 | 0.115 $\lambda_0$ |
| 8 | $Nb_2O_5$ | 89.13 | 2.38 | 0.385 $\lambda_0$ |
| 9 | $La_{0.5}Al_{1.5}O_3$ | 34.38 | 1.74 | 0.109 $\lambda_0$ |
| 10 | $Nb_2O_5$ | 69.87 | 2.38 | 0.302 $\lambda_0$ |
| 11 | $La_{0.5}Al_{1.5}O_3$ | 100.57 | 1.74 | 0.318 $\lambda_0$ |
| 12 | $Nb_2O_5$ | 58.19 | 2.38 | 0.251 $\lambda_0$ |
| 13 | $La_{0.5}Al_{1.5}O_3$ | 74.92 | 1.74 | 0.237 $\lambda_0$ |
| 14 | $Nb_2O_5$ | 74.22 | 2.38 | 0.321 $\lambda_0$ |
| 15 | $La_{0.5}Al_{1.5}O_3$ | 62.22 | 1.74 | 0.197 $\lambda_0$ |
| 16 | $Nb_2O_5$ | 81.88 | 2.38 | 0.354 $\lambda_0$ |
| 17 | $La_{0.5}Al_{1.5}O_3$ | 40.10 | 1.74 | 0.127 $\lambda_0$ |
| 18 | $Nb_2O_5$ | 69.28 | 2.38 | 0.299 $\lambda_0$ |
| 19 | $La_{0.5}Al_{1.5}O_3$ | 89.37 | 1.74 | 0.282 $\lambda_0$ |
| 20 | $Nb_2O_5$ | 60.22 | 2.38 | 0.260 $\lambda_0$ |
| 21 | $La_{0.5}Al_{1.5}O_3$ | 87.78 | 1.74 | 0.277 $\lambda_0$ |
| 22 | $Nb_2O_5$ | 59.00 | 2.38 | 0.255 $\lambda_0$ |
| 23 | $La_{0.5}Al_{1.5}O_3$ | 87.95 | 1.74 | 0.278 $\lambda_0$ |
| 24 | $Nb_2O_5$ | 70.96 | 2.38 | 0.307 $\lambda_0$ |
| 25 | $La_{0.5}Al_{1.5}O_3$ | 37.19 | 1.74 | 0.117 $\lambda_0$ |
| 26 | $Nb_2O_5$ | 78.14 | 2.38 | 0.338 $\lambda_0$ |
| 27 | $La_{0.5}Al_{1.5}O_3$ | 92.93 | 1.74 | 0.293 $\lambda_0$ |
| 28 | $Nb_2O_5$ | 42.26 | 2.38 | 0.183 $\lambda_0$ |
| 29 | $La_{0.5}Al_{1.5}O_3$ | 98.59 | 1.74 | 0.311 $\lambda_0$ |
| 30 | $Nb_2O_5$ | 65.02 | 2.38 | 0.281 $\lambda_0$ |

TABLE 2

G-reflecting dichroic coating G1 (Principal design wavelength: $\lambda_0$ = 550 nm)

| Layer number | Material | Physical thickness (nm) | Refractive index | Optical thickness |
|---|---|---|---|---|
| 31 | $La_{0.5}Al_{1.5}O_3$ | 89.81 | 1.74 | 0.284 $\lambda_0$ |
| 32 | $Nb_2O_5$ | 62.34 | 2.38 | 0.269 $\lambda_0$ |
| 33 | $La_{0.5}Al_{1.5}O_3$ | 42.53 | 1.74 | 0.134 $\lambda_0$ |
| 34 | $Nb_2O_5$ | 103.28 | 2.38 | 0.446 $\lambda_0$ |
| 35 | $La_{0.5}Al_{1.5}O_3$ | 34.38 | 1.74 | 0.109 $\lambda_0$ |
| 36 | $Nb_2O_5$ | 53.59 | 2.38 | 0.232 $\lambda_0$ |
| 37 | $La_{0.5}Al_{1.5}O_3$ | 104.60 | 1.74 | 0.330 $\lambda_0$ |
| 38 | $Nb_2O_5$ | 66.05 | 2.38 | 0.285 $\lambda_0$ |
| 39 | $La_{0.5}Al_{1.5}O_3$ | 110.26 | 1.74 | 0.348 $\lambda_0$ |
| 40 | $Nb_2O_5$ | 122.14 | 2.38 | 0.528 $\lambda_0$ |
| 41 | $La_{0.5}Al_{1.5}O_3$ | 132.55 | 1.74 | 0.419 $\lambda_0$ |
| 42 | $Nb_2O_5$ | 70.68 | 2.38 | 0.305 $\lambda_0$ |
| 43 | $SiO_2$ | 88.82 | 1.47 | 0.237 $\lambda_0$ |
| | Air | | 1.00 | |

TABLE 3

G-reflecting dichroic coating G2 (Principal design wavelength: $\lambda_0$ = 550 nm)

| Layer number | Material | Physical thickness (nm) | Refractive index | Optical thickness |
|---|---|---|---|---|
| | Prism substrate | | 1.52 | |
| 1 | $Al_2O_3$ | 159.58 | 1.63 | 0.471 $\lambda_0$ |
| 2 | $Ta_2O_5$ | 104.79 | 2.21 | 0.421 $\lambda_0$ |
| 3 | $Al_2O_3$ | 35.00 | 1.63 | 0.103 $\lambda_0$ |
| 4 | $Ta_2O_5$ | 111.47 | 2.21 | 0.448 $\lambda_0$ |
| 5 | $Al_2O_3$ | 35.00 | 1.63 | 0.103 $\lambda_0$ |
| 6 | $Ta_2O_5$ | 39.78 | 2.21 | 0.160 $\lambda_0$ |
| 7 | $Al_2O_3$ | 142.15 | 1.63 | 0.420 $\lambda_0$ |
| 8 | $Ta_2O_5$ | 63.91 | 2.21 | 0.257 $\lambda_0$ |
| 9 | $Al_2O_3$ | 96.53 | 1.63 | 0.285 $\lambda_0$ |
| 10 | $Ta_2O_5$ | 56.09 | 2.21 | 0.225 $\lambda_0$ |
| 11 | $Al_2O_3$ | 145.60 | 1.63 | 0.430 $\lambda_0$ |
| 12 | $Ta_2O_5$ | 35.00 | 2.21 | 0.141 $\lambda_0$ |
| 13 | $Al_2O_3$ | 63.44 | 1.63 | 0.187 $\lambda_0$ |
| 14 | $Ta_2O_5$ | 81.78 | 2.21 | 0.329 $\lambda_0$ |
| 15 | $Al_2O_3$ | 98.72 | 1.63 | 0.292 $\lambda_0$ |
| 16 | $Ta_2O_5$ | 65.93 | 2.21 | 0.265 $\lambda_0$ |
| 17 | $Al_2O_3$ | 94.19 | 1.63 | 0.278 $\lambda_0$ |
| 18 | $Ta_2O_5$ | 64.90 | 2.21 | 0.261 $\lambda_0$ |
| 19 | $Al_2O_3$ | 98.42 | 1.63 | 0.291 $\lambda_0$ |
| 20 | $Ta_2O_5$ | 83.34 | 2.21 | 0.335 $\lambda_0$ |
| 21 | $Al_2O_3$ | 35.00 | 1.63 | 0.103 $\lambda_0$ |
| 22 | $Ta_2O_5$ | 78.95 | 2.21 | 0.317 $\lambda_0$ |
| 23 | $Al_2O_3$ | 98.42 | 1.63 | 0.291 $\lambda_0$ |
| 24 | $Ta_2O_5$ | 66.03 | 2.21 | 0.265 $\lambda_0$ |
| 25 | $Al_2O_3$ | 96.70 | 1.63 | 0.286 $\lambda_0$ |
| 26 | $Ta_2O_5$ | 68.99 | 2.21 | 0.277 $\lambda_0$ |
| 27 | $Al_2O_3$ | 104.71 | 1.63 | 0.309 $\lambda_0$ |
| 28 | $Ta_2O_5$ | 36.00 | 2.21 | 0.145 $\lambda_0$ |
| 29 | $Al_2O_3$ | 158.85 | 1.63 | 0.469 $\lambda_0$ |
| 30 | $Ta_2O_5$ | 35.00 | 2.21 | 0.141 $\lambda_0$ |

TABLE 4

G-reflecting dichroic coating G2 (Principal design wavelength: $\lambda_0$ = 550 nm)

| Layer number | Material | Physical thickness (nm) | Refractive index | Optical thickness |
|---|---|---|---|---|
| 31 | $Al_2O_3$ | 57.96 | 1.63 | 0.171 $\lambda_0$ |
| 32 | $Ta_2O_5$ | 89.09 | 2.21 | 0.358 $\lambda_0$ |
| 33 | $Al_2O_3$ | 95.97 | 1.63 | 0.284 $\lambda_0$ |
| 34 | $Ta_2O_5$ | 96.67 | 2.21 | 0.388 $\lambda_0$ |
| 35 | $Al_2O_3$ | 67.57 | 1.63 | 0.200 $\lambda_0$ |
| 36 | $Ta_2O_5$ | 35.00 | 2.21 | 0.141 $\lambda_0$ |
| 37 | $Al_2O_3$ | 35.00 | 1.63 | 0.103 $\lambda_0$ |
| 38 | $Ta_2O_5$ | 155.25 | 2.21 | 0.624 $\lambda_0$ |
| 39 | $Al_2O_3$ | 35.00 | 1.63 | 0.103 $\lambda_0$ |
| 40 | $Ta_2O_5$ | 139.27 | 2.21 | 0.560 $\lambda_0$ |
| 41 | $Al_2O_3$ | 211.61 | 1.63 | 0.625 $\lambda_0$ |
| 42 | $Ta_2O_5$ | 113.07 | 2.21 | 0.454 $\lambda_0$ |
| 43 | $Al_2O_3$ | 93.19 | 1.63 | 0.275 $\lambda_0$ |
| 44 | $Ta_2O_5$ | 120.74 | 2.21 | 0.485 $\lambda_0$ |
| 45 | $Al_2O_3$ | 195.24 | 1.63 | 0.577 $\lambda_0$ |
| 46 | $Ta_2O_5$ | 38.95 | 2.21 | 0.157 $\lambda_0$ |
| 47 | $SiO_2$ | 100.67 | 1.47 | 0.269 $\lambda_0$ |
| | Air | | 1.00 | |

TABLE 5

G-reflecting dichroic coating G3 (Principal design wavelength: $\lambda_0$ = 550 nm)

| Layer number | Material | Physical thickness (nm) | Refractive index | Optical thickness |
|---|---|---|---|---|
|  | Prism substrate |  | 1.52 |  |
| 1 | $La_{0.9}Al_{1.1}O_3$ | 186.78 | 1.85 | 0.627 $\lambda_0$ |
| 2 | $TiO_2$ | 159.61 | 2.41 | 0.698 $\lambda_0$ |
| 3 | $La_{0.9}Al_{1.1}O_3$ | 101.32 | 1.85 | 0.340 $\lambda_0$ |
| 4 | $TiO_2$ | 71.76 | 2.41 | 0.314 $\lambda_0$ |
| 5 | $La_{0.9}Al_{1.1}O_3$ | 40.62 | 1.85 | 0.136 $\lambda_0$ |
| 6 | $TiO_2$ | 93.29 | 2.41 | 0.408 $\lambda_0$ |
| 7 | $La_{0.9}Al_{1.1}O_3$ | 43.13 | 1.85 | 0.145 $\lambda_0$ |
| 8 | $TiO_2$ | 60.24 | 2.41 | 0.264 $\lambda_0$ |
| 9 | $La_{0.9}Al_{1.1}O_3$ | 99.97 | 1.85 | 0.335 $\lambda_0$ |
| 10 | $TiO_2$ | 58.76 | 2.41 | 0.257 $\lambda_0$ |
| 11 | $La_{0.9}Al_{1.1}O_3$ | 68.84 | 1.85 | 0.231 $\lambda_0$ |
| 12 | $TiO_2$ | 65.54 | 2.41 | 0.287 $\lambda_0$ |
| 13 | $La_{0.9}Al_{1.1}O_3$ | 82.50 | 1.85 | 0.277 $\lambda_0$ |
| 14 | $TiO_2$ | 57.90 | 2.41 | 0.253 $\lambda_0$ |
| 15 | $La_{0.9}Al_{1.1}O_3$ | 81.99 | 1.85 | 0.275 $\lambda_0$ |
| 16 | $TiO_2$ | 58.30 | 2.41 | 0.255 $\lambda_0$ |
| 17 | $La_{0.9}Al_{1.1}O_3$ | 83.19 | 1.85 | 0.279 $\lambda_0$ |
| 18 | $TiO_2$ | 58.80 | 2.41 | 0.257 $\lambda_0$ |
| 19 | $La_{0.9}Al_{1.1}O_3$ | 83.07 | 1.85 | 0.279 $\lambda_0$ |
| 20 | $TiO_2$ | 58.29 | 2.41 | 0.255 $\lambda_0$ |
| 21 | $La_{0.9}Al_{1.1}O_3$ | 82.66 | 1.85 | 0.277 $\lambda_0$ |
| 22 | $TiO_2$ | 58.44 | 2.41 | 0.256 $\lambda_0$ |
| 23 | $La_{0.9}Al_{1.1}O_3$ | 83.26 | 1.85 | 0.279 $\lambda_0$ |
| 24 | $TiO_2$ | 58.84 | 2.41 | 0.257 $\lambda_0$ |
| 25 | $La_{0.9}Al_{1.1}O_3$ | 82.59 | 1.85 | 0.277 $\lambda_0$ |
| 26 | $TiO_2$ | 57.14 | 2.41 | 0.250 $\lambda_0$ |
| 27 | $La_{0.9}Al_{1.1}O_3$ | 79.02 | 1.85 | 0.265 $\lambda_0$ |
| 28 | $TiO_2$ | 71.62 | 2.41 | 0.313 $\lambda_0$ |
| 29 | $La_{0.9}Al_{1.1}O_3$ | 55.13 | 1.85 | 0.185 $\lambda_0$ |
| 30 | $TiO_2$ | 73.01 | 2.41 | 0.319 $\lambda_0$ |

TABLE 6

G-reflecting dichroic coating G3 (Principal design wavelength: $\lambda_0$ = 550 nm)

| Layer number | Material | Physical thickness (nm) | Refractive index | Optical thickness |
|---|---|---|---|---|
| 31 | $La_{0.9}Al_{1.1}O_3$ | 63.26 | 1.85 | 0.212 $\lambda_0$ |
| 32 | $TiO_2$ | 85.10 | 2.41 | 0.372 $\lambda_0$ |
| 33 | $La_{0.9}Al_{1.1}O_3$ | 37.85 | 1.85 | 0.127 $\lambda_0$ |
| 34 | $TiO_2$ | 92.03 | 2.41 | 0.403 $\lambda_0$ |
| 35 | $La_{0.9}Al_{1.1}O_3$ | 35.00 | 1.85 | 0.117 $\lambda_0$ |
| 36 | $TiO_2$ | 35.00 | 2.41 | 0.153 $\lambda_0$ |
| 37 | $La_{0.9}Al_{1.1}O_3$ | 147.46 | 1.85 | 0.495 $\lambda_0$ |
| 38 | $TiO_2$ | 35.00 | 2.41 | 0.103 $\lambda_0$ |
| 39 | $La_{0.9}Al_{1.1}O_3$ | 178.99 | 1.85 | 0.600 $\lambda_0$ |
| 40 | $TiO_2$ | 85.06 | 2.41 | 0.372 $\lambda_0$ |
| 41 | $La_{0.9}Al_{1.1}O_3$ | 99.08 | 1.85 | 0.332 $\lambda_0$ |
| 42 | $TiO_2$ | 133.30 | 2.41 | 0.583 $\lambda_0$ |
| 43 | $La_{0.9}Al_{1.1}O_3$ | 113.55 | 1.85 | 0.381 $\lambda_0$ |
| 44 | $TiO_2$ | 65.68 | 2.41 | 0.287 $\lambda_0$ |
| 45 | $La_{0.9}Al_{1.1}O_3$ | 213.49 | 1.85 | 0.716 $\lambda_0$ |
| 46 | $TiO_2$ | 88.57 | 2.41 | 0.388 $\lambda_0$ |
| 47 | $La_{0.9}Al_{1.1}O_3$ | 181.69 | 2.97 | 0.980 $\lambda_0$ |
| 48 | $TiO_2$ | 85.01 | 3.53 | 0.546 $\lambda_0$ |
| 49 | $La_{0.9}Al_{1.1}O_3$ | 113.01 | 4.09 | 0.841 $\lambda_0$ |
| 50 | $TiO_2$ | 106.75 | 3.53 | 0.685 $\lambda_0$ |
| 51 | $SiO_2$ | 94.18 | 1.47 | 0.252 $\lambda_0$ |
|  | Air |  | 1.00 |  |

TABLE 7

RB dichroic coating RB1 (Principal design wavelength: $\lambda_0$ = 550 nm)

| Layer number | Material | Physical thickness (nm) | Refractive index | Optical thickness |
|---|---|---|---|---|
|  | Prism substrate |  | 1.52 |  |
| 1 | $SiO_2$ | 89.51 | 1.47 | 0.239 $\lambda_0$ |
| 2 | $Ta_2O_5$ | 25.35 | 2.21 | 0.102 $\lambda_0$ |
| 3 | $SiO_2$ | 74.66 | 1.47 | 0.200 $\lambda_0$ |
| 4 | $Ta_2O_5$ | 48.29 | 2.21 | 0.194 $\lambda_0$ |
| 5 | $SiO_2$ | 80.50 | 1.47 | 0.215 $\lambda_0$ |
| 6 | $Ta_2O_5$ | 46.72 | 2.21 | 0.188 $\lambda_0$ |
| 7 | $SiO_2$ | 80.47 | 1.47 | 0.215 $\lambda_0$ |
| 8 | $Ta_2O_5$ | 44.93 | 2.21 | 0.181 $\lambda_0$ |
| 9 | $SiO_2$ | 82.01 | 1.47 | 0.219 $\lambda_0$ |
| 10 | $Ta_2O_5$ | 44.59 | 2.21 | 0.179 $\lambda_0$ |
| 11 | $SiO_2$ | 73.34 | 1.47 | 0.196 $\lambda_0$ |
| 12 | $Ta_2O_5$ | 42.43 | 2.21 | 0.170 $\lambda_0$ |
| 13 | $SiO_2$ | 76.15 | 1.47 | 0.204 $\lambda_0$ |
| 14 | $Ta_2O_5$ | 45.54 | 2.21 | 0.183 $\lambda_0$ |
| 15 | $SiO_2$ | 78.86 | 1.47 | 0.211 $\lambda_0$ |
| 16 | $Ta_2O_5$ | 46.04 | 2.21 | 0.185 $\lambda_0$ |
| 17 | $SiO_2$ | 83.32 | 1.47 | 0.223 $\lambda_0$ |
| 18 | $Ta_2O_5$ | 47.03 | 2.21 | 0.189 $\lambda_0$ |
| 19 | $SiO_2$ | 82.49 | 1.47 | 0.220 $\lambda_0$ |
| 20 | $Ta_2O_5$ | 73.36 | 2.21 | 0.295 $\lambda_0$ |
| 21 | $SiO_2$ | 26.70 | 1.47 | 0.071 $\lambda_0$ |
| 22 | $Ta_2O_5$ | 80.16 | 2.21 | 0.322 $\lambda_0$ |
| 23 | $SiO_2$ | 121.03 | 1.47 | 0.323 $\lambda_0$ |
| 24 | $Ta_2O_5$ | 32.33 | 2.21 | 0.130 $\lambda_0$ |
| 25 | $SiO_2$ | 85.47 | 1.47 | 0.228 $\lambda_0$ |
| 26 | $Ta_2O_5$ | 57.79 | 2.21 | 0.232 $\lambda_0$ |
| 27 | $SiO_2$ | 64.83 | 1.47 | 0.173 $\lambda_0$ |
| 28 | $Ta_2O_5$ | 97.79 | 2.21 | 0.393 $\lambda_0$ |
| 29 | $SiO_2$ | 57.93 | 1.47 | 0.155 $\lambda_0$ |
| 30 | $Ta_2O_5$ | 47.39 | 2.21 | 0.190 $\lambda_0$ |

TABLE 8

RB dichroic coating RB1 (Principal design wavelength: $\lambda_0$ = 550 nm)

| Layer number | Material | Physical thickness (nm) | Refractive index | Optical thickness |
|---|---|---|---|---|
| 31 | $SiO_2$ | 83.98 | 1.47 | 0.224 $\lambda_0$ |
| 32 | $Ta_2O_5$ | 53.31 | 2.21 | 0.214 $\lambda_0$ |
| 33 | $SiO_2$ | 133.28 | 1.47 | 0.356 $\lambda_0$ |
| 34 | $Ta_2O_5$ | 64.55 | 2.21 | 0.259 $\lambda_0$ |
| 35 | $SiO_2$ | 36.13 | 1.47 | 0.097 $\lambda_0$ |
| 36 | $Ta_2O_5$ | 54.29 | 2.21 | 0.218 $\lambda_0$ |
| 37 | $SiO_2$ | 118.20 | 1.47 | 0.316 $\lambda_0$ |
| 38 | $Ta_2O_5$ | 66.42 | 2.21 | 0.267 $\lambda_0$ |
| 39 | $SiO_2$ | 114.91 | 1.47 | 0.307 $\lambda_0$ |
| 40 | $Ta_2O_5$ | 14.62 | 2.21 | 0.059 $\lambda_0$ |
| 41 | $SiO_2$ | 91.96 | 1.47 | 0.246 $\lambda_0$ |
| 42 | $Ta_2O_5$ | 80.08 | 2.21 | 0.322 $\lambda_0$ |
| 43 | $SiO_2$ | 117.32 | 1.47 | 0.314 $\lambda_0$ |
| 44 | $Ta_2O_5$ | 10.21 | 2.21 | 0.041 $\lambda_0$ |
| 45 | $SiO_2$ | 201.38 | 1.47 | 0.538 $\lambda_0$ |
|  | Air |  | 1.00 |  |

TABLE 9

RB dichroic coating RB2 (Principal design wavelength: $\lambda_0 = 550$ nm)

| Layer number | Material | Physical thickness (nm) | Refractive index | Optical thickness |
|---|---|---|---|---|
| | Prism substrate | | 1.52 | |
| 1 | $TiO_2$ | 33.90 | 2.41 | 0.148 $\lambda_0$ |
| 2 | $La_{0.5}Al_{1.5}O_3$ | 51.68 | 1.74 | 0.163 $\lambda_0$ |
| 3 | $TiO_2$ | 57.20 | 2.41 | 0.250 $\lambda_0$ |
| 4 | $La_{0.5}Al_{1.5}O_3$ | 78.84 | 1.74 | 0.249 $\lambda_0$ |
| 5 | $TiO_2$ | 55.83 | 2.41 | 0.244 $\lambda_0$ |
| 6 | $La_{0.5}Al_{1.5}O_3$ | 67.43 | 1.74 | 0.213 $\lambda_0$ |
| 7 | $TiO_2$ | 43.81 | 2.41 | 0.192 $\lambda_0$ |
| 8 | $La_{0.5}Al_{1.5}O_3$ | 75.25 | 1.74 | 0.238 $\lambda_0$ |
| 9 | $TiO_2$ | 62.99 | 2.41 | 0.276 $\lambda_0$ |
| 10 | $La_{0.5}Al_{1.5}O_3$ | 74.28 | 1.74 | 0.235 $\lambda_0$ |
| 11 | $TiO_2$ | 51.42 | 2.41 | 0.225 $\lambda_0$ |
| 12 | $La_{0.5}Al_{1.5}O_3$ | 72.66 | 1.74 | 0.229 $\lambda_0$ |
| 13 | $TiO_2$ | 51.13 | 2.41 | 0.224 $\lambda_0$ |
| 14 | $La_{0.5}Al_{1.5}O_3$ | 76.35 | 1.74 | 0.241 $\lambda_0$ |
| 15 | $TiO_2$ | 55.26 | 2.41 | 0.242 $\lambda_0$ |
| 16 | $La_{0.5}Al_{1.5}O_3$ | 78.19 | 1.74 | 0.247 $\lambda_0$ |
| 17 | $TiO_2$ | 52.54 | 2.41 | 0.230 $\lambda_0$ |
| 18 | $La_{0.5}Al_{1.5}O_3$ | 76.10 | 1.74 | 0.240 $\lambda_0$ |
| 19 | $TiO_2$ | 51.18 | 2.41 | 0.224 $\lambda_0$ |
| 20 | $La_{0.5}Al_{1.5}O_3$ | 75.67 | 1.74 | 0.239 $\lambda_0$ |
| 21 | $TiO_2$ | 52.55 | 2.41 | 0.230 $\lambda_0$ |
| 22 | $La_{0.5}Al_{1.5}O_3$ | 78.12 | 1.74 | 0.247 $\lambda_0$ |
| 23 | $TiO_2$ | 53.89 | 2.41 | 0.236 $\lambda_0$ |
| 24 | $La_{0.5}Al_{1.5}O_3$ | 75.81 | 1.74 | 0.239 $\lambda_0$ |
| 25 | $TiO_2$ | 50.08 | 2.41 | 0.219 $\lambda_0$ |
| 26 | $La_{0.5}Al_{1.5}O_3$ | 71.62 | 1.74 | 0.226 $\lambda_0$ |
| 27 | $TiO_2$ | 47.34 | 2.41 | 0.207 $\lambda_0$ |
| 28 | $La_{0.5}Al_{1.5}O_3$ | 66.54 | 1.74 | 0.210 $\lambda_0$ |
| 29 | $TiO_2$ | 41.36 | 2.41 | 0.181 $\lambda_0$ |
| 30 | $La_{0.5}Al_{1.5}O_3$ | 44.75 | 1.74 | 0.141 $\lambda_0$ |

TABLE 10

RB dichroic coating RB2 (Principal design wavelength: $\lambda_0 = 550$ nm)

| Layer number | Material | Physical thickness (nm) | Refractive index | Optical thickness |
|---|---|---|---|---|
| 31 | $TiO_2$ | 37.79 | 2.41 | 0.165 $\lambda_0$ |
| 32 | $La_{0.5}Al_{1.5}O_3$ | 65.26 | 1.74 | 0.206 $\lambda_0$ |
| 33 | $TiO_2$ | 46.80 | 2.41 | 0.205 $\lambda_0$ |
| 34 | $La_{0.5}Al_{1.5}O_3$ | 70.63 | 1.74 | 0.223 $\lambda_0$ |
| 35 | $TiO_2$ | 47.45 | 2.41 | 0.208 $\lambda_0$ |
| 36 | $La_{0.5}Al_{1.5}O_3$ | 70.70 | 1.74 | 0.223 $\lambda_0$ |
| 37 | $TiO_2$ | 46.88 | 2.41 | 0.205 $\lambda_0$ |
| 38 | $La_{0.5}Al_{1.5}O_3$ | 66.39 | 1.74 | 0.210 $\lambda_0$ |
| 39 | $TiO_2$ | 39.75 | 2.41 | 0.174 $\lambda_0$ |
| 40 | $La_{0.5}Al_{1.5}O_3$ | 48.28 | 1.74 | 0.152 $\lambda_0$ |
| 41 | $TiO_2$ | 40.12 | 2.41 | 0.176 $\lambda_0$ |
| 42 | $La_{0.5}Al_{1.5}O_3$ | 64.54 | 1.74 | 0.204 $\lambda_0$ |
| 43 | $TiO_2$ | 45.08 | 2.41 | 0.197 $\lambda_0$ |
| 44 | $La_{0.5}Al_{1.5}O_3$ | 67.16 | 1.74 | 0.212 $\lambda_0$ |
| 45 | $TiO_2$ | 46.05 | 2.41 | 0.201 $\lambda_0$ |
| 46 | $La_{0.5}Al_{1.5}O_3$ | 69.87 | 1.74 | 0.221 $\lambda_0$ |
| 47 | $TiO_2$ | 47.69 | 2.41 | 0.209 $\lambda_0$ |
| 48 | $La_{0.5}Al_{1.5}O_3$ | 67.64 | 1.74 | 0.214 $\lambda_0$ |
| 49 | $TiO_2$ | 41.02 | 2.41 | 0.179 $\lambda_0$ |
| 50 | $La_{0.5}Al_{1.5}O_3$ | 47.29 | 1.74 | 0.149 $\lambda_0$ |
| 51 | $TiO_2$ | 40.43 | 2.41 | 0.177 $\lambda_0$ |
| 52 | $SiO_2$ | 118.21 | 1.47 | 0.316 $\lambda_0$ |
| | Air | | 1.00 | |

TABLE 11

RB dichroic coating RB3 (Principal design wavelength: $\lambda_0 = 550$ nm)

| Layer number | Material | Physical thickness (nm) | Refractive index | Optical thickness |
|---|---|---|---|---|
| | Prism substrate | | 1.52 | |
| 1 | $Al_2O_3$ | 176.42 | 1.63 | 0.521 $\lambda_0$ |
| 2 | $Nb_2O_5$ | 42.46 | 2.38 | 0.184 $\lambda_0$ |
| 3 | $Al_2O_3$ | 48.23 | 1.63 | 0.142 $\lambda_0$ |
| 4 | $Nb_2O_5$ | 56.08 | 2.38 | 0.242 $\lambda_0$ |
| 5 | $Al_2O_3$ | 82.76 | 1.63 | 0.245 $\lambda_0$ |
| 6 | $Nb_2O_5$ | 61.34 | 2.38 | 0.265 $\lambda_0$ |
| 7 | $Al_2O_3$ | 56.01 | 1.63 | 0.165 $\lambda_0$ |
| 8 | $Nb_2O_5$ | 53.72 | 2.38 | 0.232 $\lambda_0$ |
| 9 | $Al_2O_3$ | 80.16 | 1.63 | 0.237 $\lambda_0$ |
| 10 | $Nb_2O_5$ | 55.83 | 2.38 | 0.241 $\lambda_0$ |
| 11 | $Al_2O_3$ | 80.24 | 1.63 | 0.237 $\lambda_0$ |
| 12 | $Nb_2O_5$ | 52.53 | 2.38 | 0.227 $\lambda_0$ |
| 13 | $Al_2O_3$ | 75.64 | 1.63 | 0.223 $\lambda_0$ |
| 14 | $Nb_2O_5$ | 52.02 | 2.38 | 0.225 $\lambda_0$ |
| 15 | $Al_2O_3$ | 80.25 | 1.63 | 0.237 $\lambda_0$ |
| 16 | $Nb_2O_5$ | 54.09 | 2.38 | 0.234 $\lambda_0$ |
| 17 | $Al_2O_3$ | 81.53 | 1.63 | 0.241 $\lambda_0$ |
| 18 | $Nb_2O_5$ | 52.93 | 2.38 | 0.229 $\lambda_0$ |
| 19 | $Al_2O_3$ | 79.68 | 1.63 | 0.235 $\lambda_0$ |
| 20 | $Nb_2O_5$ | 51.76 | 2.38 | 0.224 $\lambda_0$ |
| 21 | $Al_2O_3$ | 78.37 | 1.63 | 0.232 $\lambda_0$ |
| 22 | $Nb_2O_5$ | 53.10 | 2.38 | 0.229 $\lambda_0$ |
| 23 | $Al_2O_3$ | 80.53 | 1.63 | 0.238 $\lambda_0$ |
| 24 | $Nb_2O_5$ | 53.28 | 2.38 | 0.230 $\lambda_0$ |
| 25 | $Al_2O_3$ | 77.48 | 1.63 | 0.229 $\lambda_0$ |
| 26 | $Nb_2O_5$ | 48.93 | 2.38 | 0.211 $\lambda_0$ |
| 27 | $Al_2O_3$ | 62.02 | 1.63 | 0.183 $\lambda_0$ |
| 28 | $Nb_2O_5$ | 38.98 | 2.38 | 0.168 $\lambda_0$ |
| 29 | $Al_2O_3$ | 42.59 | 1.63 | 0.126 $\lambda_0$ |
| 30 | $Nb_2O_5$ | 36.81 | 2.38 | 0.159 $\lambda_0$ |

TABLE 12

RB dichroic coating RB3 (Principal design wavelength: $\lambda_0 = 550$ nm)

| Layer number | Material | Physical thickness (nm) | Refractive index | Optical thickness |
|---|---|---|---|---|
| 31 | $Al_2O_3$ | 64.73 | 1.63 | 0.191 $\lambda_0$ |
| 32 | $Nb_2O_5$ | 49.42 | 2.38 | 0.214 $\lambda_0$ |
| 33 | $Al_2O_3$ | 77.07 | 1.63 | 0.228 $\lambda_0$ |
| 34 | $Nb_2O_5$ | 50.84 | 2.38 | 0.220 $\lambda_0$ |
| 35 | $Al_2O_3$ | 75.26 | 1.63 | 0.222 $\lambda_0$ |
| 36 | $Nb_2O_5$ | 46.48 | 2.38 | 0.201 $\lambda_0$ |
| 37 | $Al_2O_3$ | 53.48 | 1.63 | 0.158 $\lambda_0$ |
| 38 | $Nb_2O_5$ | 36.20 | 2.38 | 0.156 $\lambda_0$ |
| 39 | $Al_2O_3$ | 46.78 | 1.63 | 0.138 $\lambda_0$ |
| 40 | $Nb_2O_5$ | 40.24 | 2.38 | 0.174 $\lambda_0$ |
| 41 | $Al_2O_3$ | 69.02 | 1.63 | 0.204 $\lambda_0$ |
| 42 | $Nb_2O_5$ | 50.23 | 2.38 | 0.217 $\lambda_0$ |
| 43 | $Al_2O_3$ | 77.34 | 1.63 | 0.229 $\lambda_0$ |
| 44 | $Nb_2O_5$ | 50.26 | 2.38 | 0.217 $\lambda_0$ |
| 45 | $Al_2O_3$ | 66.07 | 1.63 | 0.195 $\lambda_0$ |
| 46 | $Nb_2O_5$ | 36.82 | 2.38 | 0.159 $\lambda_0$ |
| 47 | $Al_2O_3$ | 54.45 | 1.63 | 0.161 $\lambda_0$ |
| 48 | $Nb_2O_5$ | 39.36 | 2.38 | 0.170 $\lambda_0$ |
| 49 | $Al_2O_3$ | 41.73 | 1.63 | 0.123 $\lambda_0$ |
| 50 | $Nb_2O_5$ | 46.98 | 2.38 | 0.203 $\lambda_0$ |
| 51 | $Al_2O_3$ | 78.04 | 1.63 | 0.231 $\lambda_0$ |
| 52 | $Nb_2O_5$ | 54.67 | 2.38 | 0.236 $\lambda_0$ |
| 53 | $Al_2O_3$ | 52.43 | 1.63 | 0.155 $\lambda_0$ |
| 54 | $Nb_2O_5$ | 15.00 | 2.38 | 0.065 $\lambda_0$ |
| 55 | $SiO_2$ | 70.00 | 1.47 | 0.187 $\lambda_0$ |
| | Air | | 1.00 | |

TABLE 13

RB dichroic coating RB4 (Principal design wavelength: $\lambda_0 = 550$ nm)

| Layer number | Material | Physical thickness (nm) | Refractive index | Optical thickness |
|---|---|---|---|---|
| | Prism substrate | | 1.52 | |
| 1 | $Al_2O_3$ | 64.86 | 1.63 | $0.192 \lambda_0$ |
| 2 | $Nb_2O_5$ | 86.07 | 2.38 | $0.372 \lambda_0$ |
| 3 | $Al_2O_3$ | 100.15 | 1.63 | $0.296 \lambda_0$ |
| 4 | $Nb_2O_5$ | 79.40 | 2.38 | $0.343 \lambda_0$ |
| 5 | $Al_2O_3$ | 93.45 | 1.63 | $0.276 \lambda_0$ |
| 6 | $Nb_2O_5$ | 71.17 | 2.38 | $0.308 \lambda_0$ |
| 7 | $Al_2O_3$ | 111.97 | 1.63 | $0.331 \lambda_0$ |
| 8 | $Nb_2O_5$ | 59.93 | 2.38 | $0.259 \lambda_0$ |
| 9 | $Al_2O_3$ | 127.86 | 1.63 | $0.378 \lambda_0$ |
| 10 | $Nb_2O_5$ | 148.37 | 2.38 | $0.641 \lambda_0$ |
| 11 | $Al_2O_3$ | 130.10 | 1.63 | $0.384 \lambda_0$ |
| 12 | $Nb_2O_5$ | 53.84 | 2.38 | $0.233 \lambda_0$ |
| 13 | $Al_2O_3$ | 118.49 | 1.63 | $0.350 \lambda_0$ |
| 14 | $Nb_2O_5$ | 61.27 | 2.38 | $0.265 \lambda_0$ |
| 15 | $Al_2O_3$ | 105.96 | 1.63 | $0.313 \lambda_0$ |
| 16 | $Nb_2O_5$ | 64.57 | 2.38 | $0.279 \lambda_0$ |
| 17 | $Al_2O_3$ | 106.03 | 1.63 | $0.313 \lambda_0$ |
| 18 | $Nb_2O_5$ | 64.06 | 2.38 | $0.277 \lambda_0$ |
| 19 | $Al_2O_3$ | 103.76 | 1.63 | $0.307 \lambda_0$ |
| 20 | $Nb_2O_5$ | 68.13 | 2.38 | $0.294 \lambda_0$ |
| 21 | $Al_2O_3$ | 98.44 | 1.63 | $0.291 \lambda_0$ |
| 22 | $Nb_2O_5$ | 71.08 | 2.38 | $0.307 \lambda_0$ |
| 23 | $Al_2O_3$ | 97.95 | 1.63 | $0.289 \lambda_0$ |
| 24 | $Nb_2O_5$ | 72.87 | 2.38 | $0.315 \lambda_0$ |
| 25 | $Al_2O_3$ | 99.04 | 1.63 | $0.293 \lambda_0$ |
| 26 | $Nb_2O_5$ | 76.07 | 2.38 | $0.329 \lambda_0$ |
| 27 | $Al_2O_3$ | 103.14 | 1.63 | $0.305 \lambda_0$ |
| 28 | $Nb_2O_5$ | 79.16 | 2.38 | $0.342 \lambda_0$ |
| 29 | $Al_2O_3$ | 109.29 | 1.63 | $0.323 \lambda_0$ |
| 30 | $Nb_2O_5$ | 79.80 | 2.38 | $0.345 \lambda_0$ |

TABLE 14

RB dichroic coating RB4 (Principal design wavelength: $\lambda_0 = 550$ nm)

| Layer number | Material | Physical thickness (nm) | Refractive index | Optical thickness |
|---|---|---|---|---|
| 31 | $Al_2O_3$ | 109.02 | 1.63 | $0.322 \lambda_0$ |
| 32 | $Nb_2O_5$ | 76.31 | 2.38 | $0.330 \lambda_0$ |
| 33 | $Al_2O_3$ | 108.03 | 1.63 | $0.319 \lambda_0$ |
| 34 | $Nb_2O_5$ | 72.16 | 2.38 | $0.312 \lambda_0$ |
| 35 | $Al_2O_3$ | 110.98 | 1.63 | $0.328 \lambda_0$ |
| 36 | $Nb_2O_5$ | 69.75 | 2.38 | $0.301 \lambda_0$ |
| 37 | $Al_2O_3$ | 116.52 | 1.63 | $0.344 \lambda_0$ |
| 38 | $Nb_2O_5$ | 67.47 | 2.38 | $0.292 \lambda_0$ |
| 39 | $SiO_2$ | 70.79 | 1.47 | $0.189 \lambda_0$ |
| | Air | | 1.00 | |

TABLE 15

RB dichroic coating RB5 (Principal design wavelength: $\lambda_0 = 550$ nm)

| Layer number | Material | Physical thickness (nm) | Refractive index | Optical thickness |
|---|---|---|---|---|
| | Prism substrate | | 1.52 | |
| 1 | $Nb_2O_5$ | 88.69 | 2.38 | $0.383 \lambda_0$ |
| 2 | $SiO_2$ | 118.02 | 1.47 | $0.315 \lambda_0$ |
| 3 | $Nb_2O_5$ | 82.90 | 2.38 | $0.358 \lambda_0$ |
| 4 | $SiO_2$ | 100.89 | 1.47 | $0.270 \lambda_0$ |
| 5 | $Nb_2O_5$ | 83.02 | 2.38 | $0.359 \lambda_0$ |
| 6 | $SiO_2$ | 101.24 | 1.47 | $0.271 \lambda_0$ |

TABLE 15-continued

RB dichroic coating RB5 (Principal design wavelength: $\lambda_0 = 550$ nm)

| Layer number | Material | Physical thickness (nm) | Refractive index | Optical thickness |
|---|---|---|---|---|
| 7 | $Nb_2O_5$ | 78.54 | 2.38 | $0.339 \lambda_0$ |
| 8 | $SiO_2$ | 111.54 | 1.47 | $0.298 \lambda_0$ |
| 9 | $Nb_2O_5$ | 73.29 | 2.38 | $0.317 \lambda_0$ |
| 10 | $SiO_2$ | 115.30 | 1.47 | $0.308 \lambda_0$ |
| 11 | $Nb_2O_5$ | 73.84 | 2.38 | $0.319 \lambda_0$ |
| 12 | $SiO_2$ | 109.73 | 1.47 | $0.293 \lambda_0$ |
| 13 | $Nb_2O_5$ | 76.23 | 2.38 | $0.329 \lambda_0$ |
| 14 | $SiO_2$ | 108.03 | 1.47 | $0.289 \lambda_0$ |
| 15 | $Nb_2O_5$ | 74.74 | 2.38 | $0.323 \lambda_0$ |
| 16 | $SiO_2$ | 114.02 | 1.47 | $0.305 \lambda_0$ |
| 17 | $Nb_2O_5$ | 71.62 | 2.38 | $0.310 \lambda_0$ |
| 18 | $SiO_2$ | 117.29 | 1.47 | $0.313 \lambda_0$ |
| 19 | $Nb_2O_5$ | 71.86 | 2.38 | $0.311 \lambda_0$ |
| 20 | $SiO_2$ | 114.62 | 1.47 | $0.306 \lambda_0$ |
| 21 | $Nb_2O_5$ | 73.42 | 2.38 | $0.317 \lambda_0$ |
| 22 | $SiO_2$ | 114.79 | 1.47 | $0.307 \lambda_0$ |
| 23 | $Nb_2O_5$ | 72.34 | 2.38 | $0.313 \lambda_0$ |
| 24 | $SiO_2$ | 120.99 | 1.47 | $0.323 \lambda_0$ |
| 25 | $Nb_2O_5$ | 69.91 | 2.38 | $0.302 \lambda_0$ |
| 26 | $SiO_2$ | 127.87 | 1.47 | $0.342 \lambda_0$ |
| 27 | $Nb_2O_5$ | 71.44 | 2.38 | $0.309 \lambda_0$ |
| 28 | $SiO_2$ | 134.38 | 1.47 | $0.359 \lambda_0$ |
| 29 | $Nb_2O_5$ | 78.74 | 2.38 | $0.340 \lambda_0$ |
| 30 | $SiO_2$ | 145.15 | 1.47 | $0.388 \lambda_0$ |

TABLE 16

RB dichroic coating RB5 (Principal design wavelength: $\lambda_0 = 550$ nm)

| Layer number | Material | Physical thickness (nm) | Refractive index | Optical thickness |
|---|---|---|---|---|
| 31 | $Nb_2O_5$ | 80.83 | 2.38 | $0.349 \lambda_0$ |
| 32 | $SiO_2$ | 137.58 | 1.47 | $0.368 \lambda_0$ |
| 33 | $Nb_2O_5$ | 73.54 | 2.38 | $0.318 \lambda_0$ |
| 34 | $SiO_2$ | 132.88 | 1.47 | $0.355 \lambda_0$ |
| 35 | $Nb_2O_5$ | 70.17 | 2.38 | $0.303 \lambda_0$ |
| 36 | $SiO_2$ | 132.81 | 1.47 | $0.355 \lambda_0$ |
| 37 | $Nb_2O_5$ | 72.14 | 2.38 | $0.312 \lambda_0$ |
| 38 | $SiO_2$ | 137.02 | 1.47 | $0.366 \lambda_0$ |
| 39 | $Nb_2O_5$ | 72.74 | 2.38 | $0.314 \lambda_0$ |
| 40 | $SiO_2$ | 69.49 | 1.47 | $0.186 \lambda_0$ |
| | Air | | 1.00 | |

TABLE 17

RB dichroic coating RB6 (Principal design wavelength: $\lambda_0 = 550$ nm)

| Layer number | Material | Physical thickness (nm) | Refractive index | Optical thickness |
|---|---|---|---|---|
| | Prism substrate | | 1.52 | |
| 1 | $SiO_2$ | 97.56 | 1.47 | $0.261 \lambda_0$ |
| 2 | $Ta_2O_5$ | 17.06 | 2.21 | $0.069 \lambda_0$ |
| 3 | $SiO_2$ | 88.61 | 1.47 | $0.237 \lambda_0$ |
| 4 | $Ta_2O_5$ | 32.83 | 2.21 | $0.132 \lambda_0$ |
| 5 | $SiO_2$ | 99.96 | 1.47 | $0.267 \lambda_0$ |
| 6 | $Ta_2O_5$ | 30.32 | 2.21 | $0.122 \lambda_0$ |
| 7 | $SiO_2$ | 96.44 | 1.47 | $0.258 \lambda_0$ |
| 8 | $Ta_2O_5$ | 29.85 | 2.21 | $0.120 \lambda_0$ |
| 9 | $SiO_2$ | 105.11 | 1.47 | $0.281 \lambda_0$ |
| 10 | $Ta_2O_5$ | 15.83 | 2.21 | $0.064 \lambda_0$ |
| 11 | $SiO_2$ | 111.45 | 1.47 | $0.298 \lambda_0$ |
| 12 | $Ta_2O_5$ | 11.82 | 2.21 | $0.047 \lambda_0$ |

TABLE 17-continued

RB dichroic coating RB6 (Principal design wavelength: $\lambda_0 = 550$ nm)

| Layer number | Material | Physical thickness (nm) | Refractive index | Optical thickness |
|---|---|---|---|---|
| 13 | $SiO_2$ | 106.99 | 1.47 | $0.286\ \lambda_0$ |
| 14 | $Ta_2O_5$ | 23.56 | 2.21 | $0.095\ \lambda_0$ |
| 15 | $SiO_2$ | 94.34 | 1.47 | $0.252\ \lambda_0$ |
| 16 | $Ta_2O_5$ | 36.51 | 2.21 | $0.147\ \lambda_0$ |
| 17 | $SiO_2$ | 90.65 | 1.47 | $0.242\ \lambda_0$ |
| 18 | $Ta_2O_5$ | 42.84 | 2.21 | $0.172\ \lambda_0$ |
| 19 | $SiO_2$ | 87.75 | 1.47 | $0.235\ \lambda_0$ |
| 20 | $Ta_2O_5$ | 45.34 | 2.21 | $0.182\ \lambda_0$ |
| 21 | $SiO_2$ | 86.82 | 1.47 | $0.232\ \lambda_0$ |
| 22 | $Ta_2O_5$ | 47.40 | 2.21 | $0.190\ \lambda_0$ |
| 23 | $SiO_2$ | 87.05 | 1.47 | $0.233\ \lambda_0$ |
| 24 | $Ta_2O_5$ | 48.41 | 2.21 | $0.195\ \lambda_0$ |
| 25 | $SiO_2$ | 87.26 | 1.47 | $0.233\ \lambda_0$ |
| 26 | $Ta_2O_5$ | 48.25 | 2.21 | $0.194\ \lambda_0$ |
| 27 | $SiO_2$ | 88.17 | 1.47 | $0.236\ \lambda_0$ |
| 28 | $Ta_2O_5$ | 47.68 | 2.21 | $0.192\ \lambda_0$ |
| 29 | $SiO_2$ | 91.23 | 1.47 | $0.244\ \lambda_0$ |
| 30 | $Ta_2O_5$ | 44.65 | 2.21 | $0.179\ \lambda_0$ |

TABLE 18

RB dichroic coating RB6 (Principal design wavelength: $\lambda_0 = 550$ nm)

| Layer number | Material | Physical thickness (nm) | Refractive index | Optical thickness |
|---|---|---|---|---|
| 31 | $SiO_2$ | 98.73 | 1.47 | $0.264\ \lambda_0$ |
| 32 | $Ta_2O_5$ | 34.27 | 2.21 | $0.138\ \lambda_0$ |
| 33 | $SiO_2$ | 135.73 | 1.47 | $0.363\ \lambda_0$ |
| 34 | $Ta_2O_5$ | 15.01 | 2.21 | $0.060\ \lambda_0$ |
| 35 | $SiO_2$ | 140.40 | 1.47 | $0.375\ \lambda_0$ |
| 36 | $Ta_2O_5$ | 38.75 | 2.21 | $0.156\ \lambda_0$ |
| 37 | $SiO_2$ | 107.17 | 1.47 | $0.286\ \lambda_0$ |
| 38 | $Ta_2O_5$ | 20.54 | 2.21 | $0.083\ \lambda_0$ |
| 39 | $SiO_2$ | 110.31 | 1.47 | $0.295\ \lambda_0$ |
| 40 | $Ta_2O_5$ | 48.39 | 2.21 | $0.194\ \lambda_0$ |
| 41 | $SiO_2$ | 134.70 | 1.47 | $0.360\ \lambda_0$ |
|  | Air |  | 1.00 |  |

TABLE 19

RB dichroic coating RB7 (Principal design wavelength: $\lambda_0 = 550$ nm)

| Layer number | Material | Physical thickness (nm) | Refractive index | Optical thickness |
|---|---|---|---|---|
|  | Prism substrate |  | 1.52 |  |
| 1 | $Al_2O_3$ | 74.91 | 1.63 | $0.221\ \lambda_0$ |
| 2 | $Nb_2O_5$ | 89.36 | 2.38 | $0.386\ \lambda_0$ |
| 3 | $Al_2O_3$ | 114.30 | 1.63 | $0.338\ \lambda_0$ |
| 4 | $Nb_2O_5$ | 82.74 | 2.38 | $0.358\ \lambda_0$ |
| 5 | $Al_2O_3$ | 98.72 | 1.63 | $0.292\ \lambda_0$ |
| 6 | $Nb_2O_5$ | 83.65 | 2.38 | $0.362\ \lambda_0$ |
| 7 | $Al_2O_3$ | 97.96 | 1.63 | $0.289\ \lambda_0$ |
| 8 | $Nb_2O_5$ | 79.37 | 2.38 | $0.343\ \lambda_0$ |
| 9 | $Al_2O_3$ | 118.72 | 1.63 | $0.351\ \lambda_0$ |
| 10 | $Nb_2O_5$ | 176.88 | 2.38 | $0.764\ \lambda_0$ |
| 11 | $Al_2O_3$ | 117.54 | 1.63 | $0.347\ \lambda_0$ |
| 12 | $Nb_2O_5$ | 78.43 | 2.38 | $0.339\ \lambda_0$ |
| 13 | $Al_2O_3$ | 95.62 | 1.63 | $0.283\ \lambda_0$ |
| 14 | $Nb_2O_5$ | 79.92 | 2.38 | $0.345\ \lambda_0$ |
| 15 | $Al_2O_3$ | 98.82 | 1.63 | $0.292\ \lambda_0$ |
| 16 | $Nb_2O_5$ | 74.01 | 2.38 | $0.320\ \lambda_0$ |
| 17 | $Al_2O_3$ | 108.50 | 1.63 | $0.321\ \lambda_0$ |

TABLE 19-continued

RB dichroic coating RB7 (Principal design wavelength: $\lambda_0 = 550$ nm)

| Layer number | Material | Physical thickness (nm) | Refractive index | Optical thickness |
|---|---|---|---|---|
| 18 | $Nb_2O_5$ | 70.38 | 2.38 | $0.304\ \lambda_0$ |
| 19 | $Al_2O_3$ | 107.72 | 1.63 | $0.318\ \lambda_0$ |
| 20 | $Nb_2O_5$ | 74.35 | 2.38 | $0.321\ \lambda_0$ |
| 21 | $Al_2O_3$ | 99.50 | 1.63 | $0.294\ \lambda_0$ |
| 22 | $Nb_2O_5$ | 78.38 | 2.38 | $0.339\ \lambda_0$ |
| 23 | $Al_2O_3$ | 98.13 | 1.63 | $0.290\ \lambda_0$ |
| 24 | $Nb_2O_5$ | 76.09 | 2.38 | $0.329\ \lambda_0$ |
| 25 | $Al_2O_3$ | 109.58 | 1.63 | $0.324\ \lambda_0$ |
| 26 | $Nb_2O_5$ | 69.10 | 2.38 | $0.299\ \lambda_0$ |
| 27 | $Al_2O_3$ | 121.56 | 1.63 | $0.359\ \lambda_0$ |
| 28 | $Nb_2O_5$ | 65.56 | 2.38 | $0.283\ \lambda_0$ |
| 29 | $Al_2O_3$ | 125.66 | 1.63 | $0.371\ \lambda_0$ |
| 30 | $Nb_2O_5$ | 70.09 | 2.38 | $0.303\ \lambda_0$ |

TABLE 20

RB dichroic coating RB7 (Principal design wavelength: $\lambda_0 = 550$ nm)

| Layer number | Material | Physical thickness (nm) | Refractive index | Optical thickness |
|---|---|---|---|---|
| 31 | $Al_2O_3$ | 126.35 | 1.63 | $0.373\ \lambda_0$ |
| 32 | $Nb_2O_5$ | 75.23 | 2.38 | $0.325\ \lambda_0$ |
| 33 | $Al_2O_3$ | 127.13 | 1.63 | $0.376\ \lambda_0$ |
| 34 | $Nb_2O_5$ | 76.78 | 2.38 | $0.332\ \lambda_0$ |
| 35 | $Al_2O_3$ | 126.05 | 1.63 | $0.372\ \lambda_0$ |
| 36 | $Nb_2O_5$ | 76.49 | 2.38 | $0.331\ \lambda_0$ |
| 37 | $Al_2O_3$ | 127.19 | 1.63 | $0.376\ \lambda_0$ |
| 38 | $Nb_2O_5$ | 76.46 | 2.38 | $0.330\ \lambda_0$ |
| 39 | $SiO_2$ | 75.58 | 1.47 | $0.202\ \lambda_0$ |
|  | Air |  | 1.00 |  |

TABLE 21

Data of dichroic coatings C1 and C2

|  | (in glass) | | (in air) | |
|---|---|---|---|---|
|  | C1 (G reflection) | C2 (RB) | C1 (G reflection) | C2 (RB) |
| Surface angle $\beta1$, $\beta2$ (°) | 28.5 | 11.25 | 28.5 | 11.25 |
| Angle (°) of incidence of illumination light L1 | 28.5 | 27.60 | 46.4 | 44.70 |
| Angle (°) of incidence of projection light L2 | 28.5 | 11.25 | 46.4 | 17.20 |

TABLE 22

| | C1 | C2 | G reflection | | RB | Conditional Expression (1) |
|---|---|---|---|---|---|---|
| | G reflection | RB | λ gb | λ rg | λ rd | 0.67 λ rg + 0.33 λ gb |
| Example 1 | G1 | RB1 | 498 | 590 | 571 | 559.64 |
| Example 2 | G2 | RB2 | 507 | 602 | 573 | 570.65 |
| Example 3 | G3 | RB3 | 509 | 598 | 574 | 568.63 |
| Example 4 | G3 | RB4 | 509 | 598 | 569 | 568.63 |
| Example 5 | G2 | RB5 | 507 | 602 | 582 | 570.65 |
| Comparative Example 1 | G1 | RB6 | 498 | 590 | 538 | 559.64 |
| Comparative Example 2 | G3 | RB7 | 509 | 598 | 605 | 568.63 |

| | C1 | C2 | G reflection | | | RB | Conditional Expression (2A) |
|---|---|---|---|---|---|---|---|
| | G reflection | RB | λ pgb | λ prg | λ irg | λ prd | 0.67 λ prg + 0.33 λ pgb |
| Example 1 | G1 | RB1 | 498 | 590 | 591 | 571 | 559.64 |
| Example 2 | G2 | RB2 | 507 | 602 | 603 | 573 | 570.65 |
| Example 3 | G3 | RB3 | 509 | 598 | 599 | 574 | 568.63 |
| Example 4 | G3 | RB4 | 509 | 598 | 599 | 569 | 568.63 |
| Example 5 | G2 | RB5 | 507 | 602 | 603 | 582 | 570.65 |
| Comparative Example 1 | G1 | RB6 | 498 | 590 | 591 | 538 | 559.64 |
| Comparative Example 2 | G3 | RB7 | 509 | 598 | 599 | 605 | 568.63 |

| | C1 | C2 | G reflection | | RB | Conditional Expression (2B) |
|---|---|---|---|---|---|---|
| | G reflection | RB | λ pgb | λ prg | λ ird | 0.5 λ prg + 0.5 λ pgb |
| Example 1 | G1 | RB1 | 498 | 590 | 532 | 544.0 |
| Example 2 | G2 | RB2 | 507 | 602 | 544 | 554.5 |
| Example 3 | G3 | RB3 | 509 | 598 | 545 | 553.5 |
| Example 4 | G3 | RB4 | 509 | 598 | 537 | 553.5 |
| Example 5 | G2 | RB5 | 507 | 602 | 545 | 554.5 |
| Comparative Example 1 | G1 | RB6 | 498 | 590 | 500 | 544.0 |
| Comparative Example 2 | G3 | RB7 | 509 | 598 | 573 | 553.5 |

TABLE 23

| | Conditional Expression (1) | |
|---|---|---|
| | λ rg ≥ λ rb | λ rb ≥ 0.67 λ rg + 0.33 λ gb |
| Example 1 | ○ | ○ |
| Example 2 | ○ | ○ |
| Example 3 | ○ | ○ |
| Example 4 | ○ | ○ |
| Example 5 | ○ | ○ |
| Comparative Example 1 | ○ | X |
| Comparative Example 2 | X | ○ |

| | Conditional Expression (2A) | |
|---|---|---|
| | λ irg ≥ λ prb | λ prb ≥ 0.67 λ prg + 0.33 λ pgb |
| Example 1 | ○ | ○ |
| Example 2 | ○ | ○ |
| Example 3 | ○ | ○ |
| Example 4 | ○ | ○ |
| Example 5 | ○ | ○ |
| Comparative Example 1 | ○ | X |
| Comparative Example 2 | X | ○ |

TABLE 23-continued

| | Conditional Expression (2B) | |
|---|---|---|
| | 0.5 λ prg + 0.5 λ pgb ≥ λ irb | λ irb ≥ λ pgb |
| Example 1 | ○ | ○ |
| Example 2 | ○ | ○ |
| Example 3 | ○ | ○ |
| Example 4 | ○ | ○ |
| Example 5 | ○ | ○ |
| Comparative Example 1 | ○ | ○ |
| Comparative Example 2 | X | ○ |

With a prism unit according to one or more embodiments of the present invention, the cutoff wavelength of the RB dichroic coating is set within a predetermined range, so that the cutoff wavelength falls within the G wavelength band at both angles of incidence of the projection light path and the illumination light path. Accordingly, light loss at the dichroic coatings is reduced in both projection light and illumination light, and light use efficiency can be increased. As this prism unit is included in a projector, a bright and high-performance three-plate projector can be realized.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A prism unit that combines light in the three primary colors of Red, Green, and Blue on the same optical axis, the prism unit comprising: a G-reflecting dichroic coating that reflects Green light and passes Red and Blue light; and an RB dichroic coating that reflects one of Red and Blue, and passes the other one of Red and Blue, wherein the prism unit satisfies the following conditional expression:

$$\lambda rg \geq \lambda rb \geq 0.67 \times \lambda rg + 0.33 \times \lambda gb \quad (1)$$

where $\lambda gb$ represent a wavelength at which a transmittance is 50% when the colors of Green and Blue on a composite optical axis are combined in the G-reflecting dichroic coating, $\lambda rg$ represents a wavelength at which the transmittance is 50% when the colors of Red and Green on the composite optical axis are combined in the G-reflecting dichroic coating, and $\lambda rb$ represents a wavelength at which the transmittance is 50% when the colors of Red and Blue on the composite optical axis are combined in the RB dichroic coating.

2. The prism unit according to claim 1, wherein
the G-reflecting dichroic coating and the RB dichroic coating are formed from at least two vapor-deposited materials of a high-refractive-index material, an intermediate-refractive-index material, and a low-refractive-index material,
the high-refractive-index material is one of $TiO_2$, $Nb_2O_5$, and $Ta_2O_5$,
the intermediate-refractive-index material is one of $Al_2O_3$ and a mixed oxide of $Al_2O_3$ and $La_2O_3$, and
the low-refractive-index material is $SiO_2$.

3. A projector comprising: the prism unit according to claim 1; three image display devices that display a Red image, a Green image, and a Blue image on respective image display surfaces; an illumination optical system that illuminates the respective image display surfaces; and a projection optical system that projects the images displayed on the respective image display surfaces onto a screen, wherein the prism unit is a color separating/combining prism that separates colors in illumination light and combine colors for projection light, an angle of incidence of principal illumination light with respect to the image display surfaces differs from an angle of emission of principal projection light with respect to the image display surfaces, and the angles of incidence of the principal projection light and the principal illumination light with respect to the G-reflecting dichroic coating are substantially the same.

4. The projector according to claim 3, wherein the prism unit satisfies the following conditional expressions (2A) and (2B):

$$\lambda irg \geq \lambda prb \geq 0.67 \times \lambda prg + 0.33 \times \lambda pgb \quad (2A)$$

$$0.5 \times \lambda prg + 0.5 \times \lambda pgb > \lambda irb \geq \lambda pgb \quad (2B)$$

where $\lambda irg$ represents a wavelength at which the transmittance is 50% when the colors of Red and Green in the principal illumination light are separated from each other in the G-reflecting dichroic coating, $\lambda prg$ represents a wavelength at which the transmittance is 50% when the colors of Red and Green in the principal projection light are combined in the G-reflecting dichroic coating, $\lambda irb$ represents a wavelength at which the transmittance is 50% when the colors of Red and Blue in the principal Illumination light are separated from each other in the RB dichroic coating, $\lambda prb$ represents a wavelength at which the transmittance is 50% when the colors of Red and Blue in the principal projection light are combined in the RB dichroic coating, and $\lambda pgb$ represents a wavelength at which the transmittance is 50% when the colors of Green and Blue in the principal projection light are combined in the G-reflecting dichroic coating.

5. The projector according to claim 3, wherein the composite optical axis of the prism unit and the principal projection light coincide with each other.

* * * * *